(12) United States Patent
Warren

(10) Patent No.: US 11,479,420 B2
(45) Date of Patent: Oct. 25, 2022

(54) AUTOMATIC TOTE ACCUMULATOR WITH CAM-ACTUATED STACK RETAINING LATCH

(71) Applicant: Siemens Logistics LLC, DFW Airport, TX (US)

(72) Inventor: Lelan D. Warren, Dallas, TX (US)

(73) Assignee: Körber Supply Chain LLC, DFW Airport, TX (US)

( * ) Notice: Subject to any disclaimer, the term of this patent is extended or adjusted under 35 U.S.C. 154(b) by 280 days.

(21) Appl. No.: 16/984,296

(22) Filed: Aug. 4, 2020

(65) Prior Publication Data

US 2021/0061589 A1 Mar. 4, 2021

Related U.S. Application Data

(60) Provisional application No. 62/891,637, filed on Aug. 26, 2019.

(51) Int. Cl.
*G06F 7/00* (2006.01)
*B65G 59/10* (2006.01)
*B65G 1/137* (2006.01)

(52) U.S. Cl.
CPC ........... *B65G 59/106* (2013.01); *B65G 1/137* (2013.01); *B65G 2201/0258* (2013.01)

(58) Field of Classification Search
CPC ................. B65G 59/106; B65G 1/137; B65G 2201/0258; B65G 57/301; B65G 59/103; B65G 57/165

USPC ................................ 700/213–214, 217, 228
See application file for complete search history.

(56) References Cited

U.S. PATENT DOCUMENTS

| | | | |
|---|---|---|---|
| 4,865,515 A | 9/1989 | Dorner et al. | |
| 2015/0021354 A1* | 1/2015 | Redman | B65G 59/063 221/297 |
| 2015/0125249 A1 | 5/2015 | Joice et al. | |
| 2017/0267468 A1* | 9/2017 | Redman | B65G 59/00 |
| 2020/0207556 A1* | 7/2020 | Redman | B65G 59/067 |

* cited by examiner

*Primary Examiner* — Yolanda R Cumbess

(57) ABSTRACT

A tote accumulator includes stack retaining latches that are configured to be acted on by a cam and follower mechanism and additionally by a holding mechanism. The cam and follower mechanism is configured to act on the stack retaining latches when the stack of totes is moved vertically by a lifting member, to move the stack retaining latches into an active dwell wherein the stack retaining latches are engaged with the stack of totes. The holding mechanism is configured to be activated to extend the active dwell after the cam and follower mechanism ceases to act on the stack retaining latches. The active dwell is extended even further by a mechanical interlocking feature between the latches and the totes. In various implementations, the design of the cam and follower arrangement and the activation timing of the holding mechanism may be adapted to execute a stacking or an unstacking operation.

20 Claims, 22 Drawing Sheets

AUTOMATIC TOTE ACCUMULATOR WITH CAM-ACTUATED STACK RETAINING LATCH

CROSS REFERENCE TO RELATED APPLICATIONS

This application claims priority to the U.S. provisional application No. 62/891,637, filed Aug. 26, 2019, which is incorporated by reference herein in its entirety.

TECHNICAL FIELD

The present disclosure relates, in general, to the use of totes in material handling operations, and more specifically, to a technique for stacking and unstacking totes.

BACKGROUND

Containers, often referred to as totes, are used in many material handling operations to maintain an association of multiple items that share downstream processing, and to establish a common mechanical handling interface across a very wide range of physical characteristics among the goods being handled. While these worthwhile benefits simplify certain aspects of material handling, other aspects become more complex when totes are used.

There is typically a point near the end of processing where empty totes collect, and a point at the beginning of processing where empty totes are needed. Addressing the accumulation of totes and connecting the end of the process to the beginning of the process require additional handling systems within the material handling system, whose function is to circulate and position empty containers at the appropriate points in the system so that material can be loaded into them for subsequent processing.

SUMMARY

Briefly aspects of the present disclosure relate to a tote accumulator with cam-actuated stack retaining latches. Aspects of the disclosure may be embodied in tote unstacking apparatus and a tote unstacking operation, as well as in a tote stacking apparatus and a tote stacking operation.

According to a first aspect, an apparatus for separating totes from a stack of totes is provided. The apparatus comprises first and second latches configured to be arranged on first and second sides of a stack of totes and engaged with a lowermost tote in the stack of totes to retain the stack of totes. The apparatus further comprises a lifting member configured to engage with a bottom of the lowermost tote and raise the stack of totes to disengage the first and second latches from the lowermost tote. The apparatus further comprises a cam and a respective follower arranged on each of the first and second sides and configured such that, upon lowering of the lifting member by a first distance after the disengagement of the latches, each cam interacts with the respective follower to act on the first and second latches to engage with a next tote above the lowermost tote. The apparatus further comprises holding mechanism configured to act on the first and second latches to maintain engagement with the next tote when the cams cease to interact with the respective followers upon lowering of the lifting member beyond the first distance. Upon still further lowering of the lifting member, each latch interlocks with a mating feature on the next tote and the lowermost tote is separated from the stack of totes.

According to a second aspect, an apparatus for accumulating totes in a stack is provided. The apparatus comprises first and second latches configured to be arranged on first and second sides of a stack of totes and engaged with a lowermost tote in the stack of totes to retain the stack of totes. The apparatus further comprises a lifting member configured to receive a fresh tote and move the fresh tote upward into engagement with the stack of totes, whereby the stack of totes is raised to disengage the first and second latches from the lowermost tote. The apparatus further comprises a cam and a respective follower arranged on each of the first and second sides and configured such that, upon further raising of the lifting member after the disengagement of the first and second latches, each cam interacts with the respective follower to act on the first and second latches to engage with the fresh tote. The apparatus further comprises holding mechanism configured to act on the first and second latches to maintain engagement with the fresh tote upon lowering of the lifting member when the cams cease to interact with the respective followers. Upon further lowering of the lifting member, each latch interlocks with a mating feature on the fresh tote, whereby the fresh tote is attached to the stack of totes.

Other aspects of the disclosure are directed to methods for operating the above-described apparatuses.

DETAILED DESCRIPTION

Figure 1:
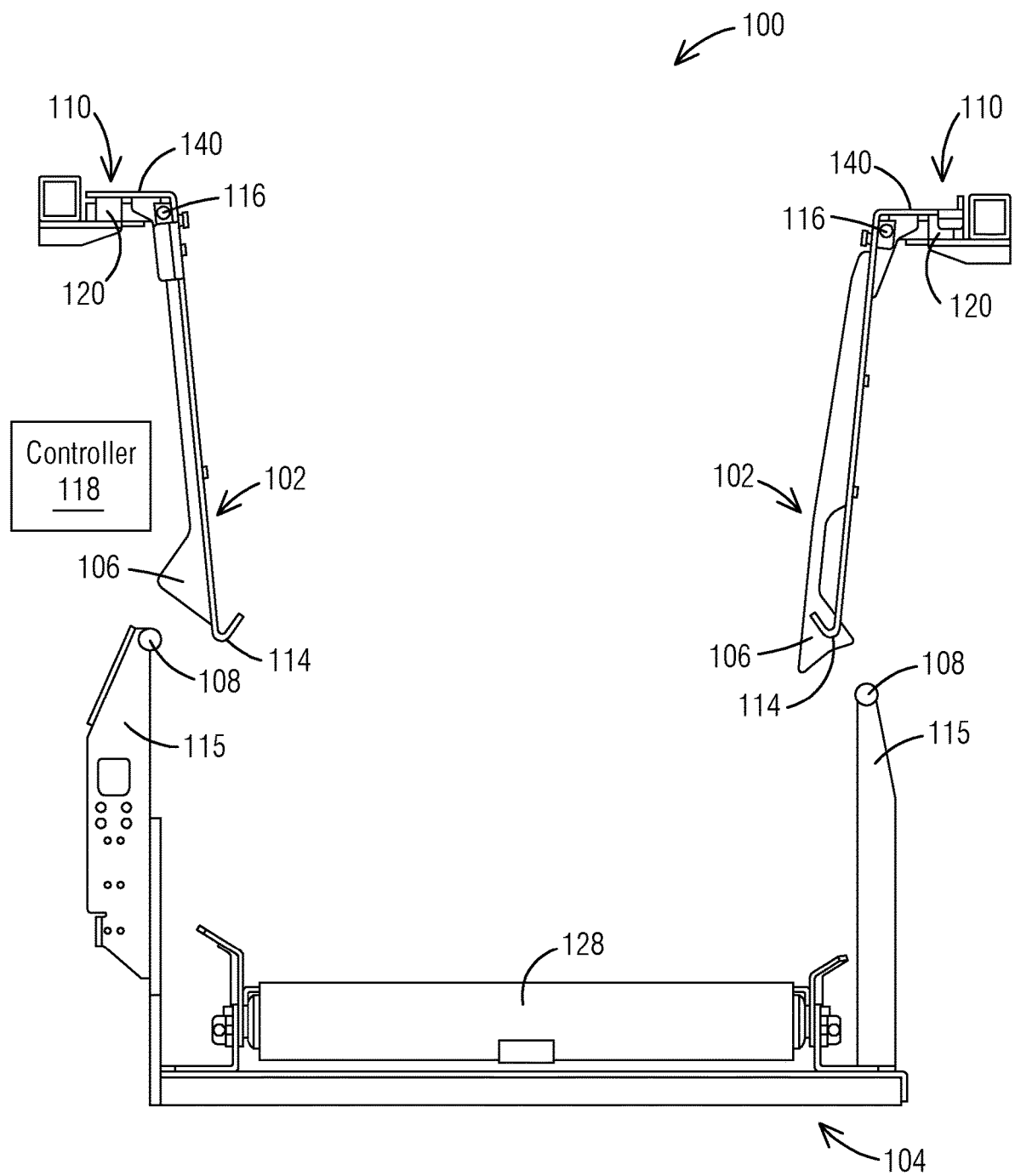
FIG. 1 is an end view of an apparatus for unstacking a stack of totes, according to an embodiment of the disclosure.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

In material handling applications, such as in order fulfillment systems, containers, referred to as "totes" may be used, for example, for common mechanical handling of batches of items. At locations in the operation where items need to be containerized, it is desirable to have continuous availability of empty totes. A first variant of the present disclosure provides an apparatus and method for separating or unstacking totes from a stack of totes to be conveyed to these locations. At certain other locations in the operation, after the contents of the totes are emptied for subsequent processing, it is desirable to store the totes in a manner that they occupy minimum space and may be conveniently moved around. A second variant of the present disclosure provides an apparatus and method for stacking of totes, which may be employed at such locations.

Prior tote stacking and unstacking systems utilized pneumatic cylinders to actuate gripping and latching devices, which are the means by which individual totes can be taken away from the stack. However, the reliance on pneumatic devices requires a supply of industrial compressed air. In addition, pneumatic cylinders are affected by variations in friction and wear which can lead to imprecise timing of the gripping and latching in relation to the lifting of the stack of totes.

Aspects of the present disclosure provide a tote accumulator that includes stack retaining latches that are configured to be acted on by a cam and follower mechanism and additionally by a holding mechanism. The cam and follower mechanism is configured to act on the stack retaining latches when the stack of totes is moved vertically by a lifting member, to move the stack retaining latches into an active dwell, wherein the stack retaining latches are engaged with the stack of totes. The holding mechanism is configured to be activated to extend the active dwell after the cam and follower mechanism ceases to act on the stack retaining latches. The active dwell is extended even further by a mechanical interlocking feature between the latches and the totes. In various implementations, the design of the cam and follower arrangement and the activation timing of the holding mechanism may be adapted to execute a stacking or an unstacking operation. The cam and follower arrangement provide a high precision of operation while the holding mechanism may effectively bridge the cam timing depending on the lift position in a stack/unstack cycle.

A tote unstacking apparatus and a corresponding method is illustrated referring to FIG. 1-12.

Figure 2:
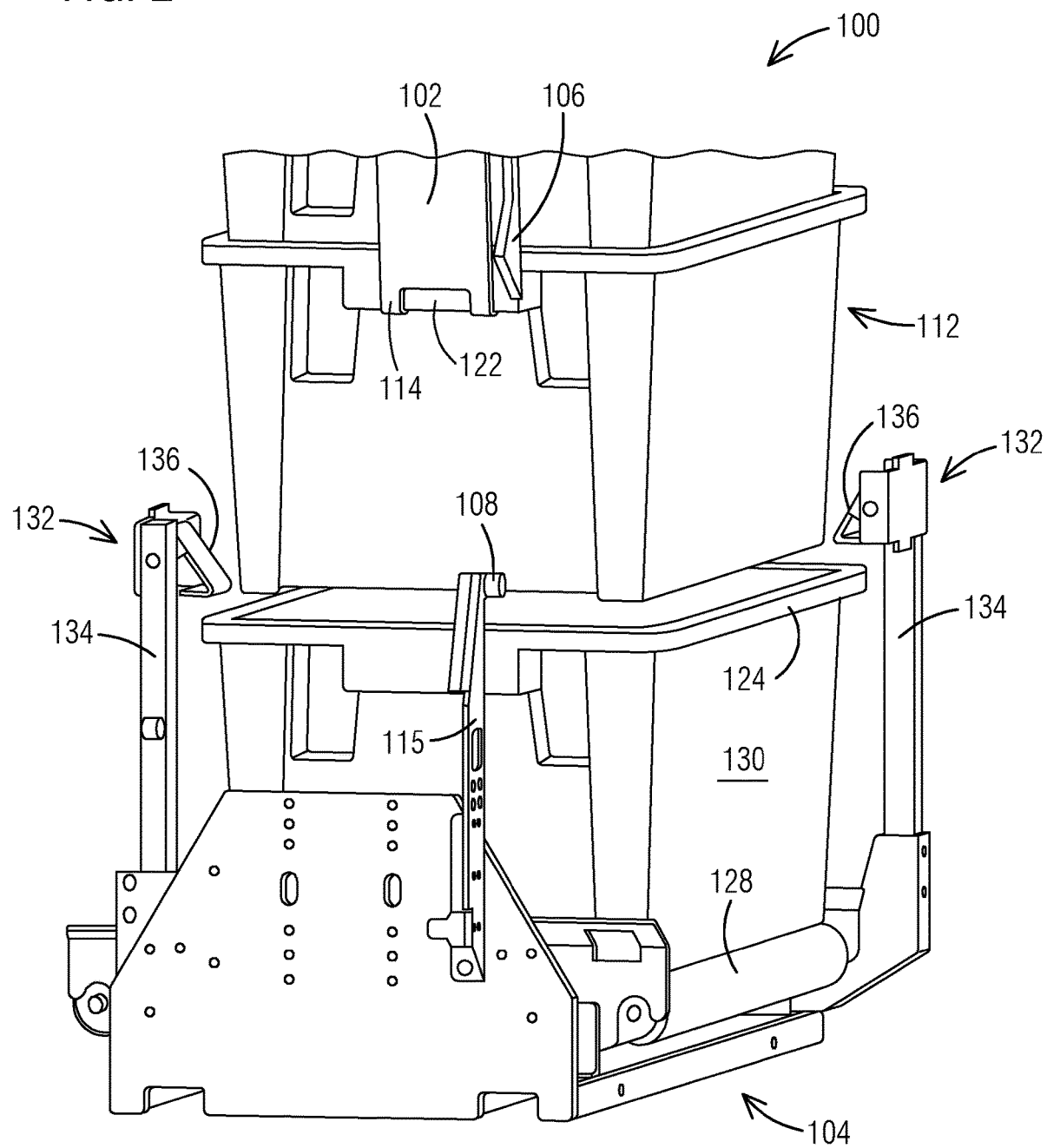
FIG. 2 and FIG. 3 respectively show a perspective view and an end view of the apparatus of FIG. 1 supporting a stack of totes.
Figure 3:
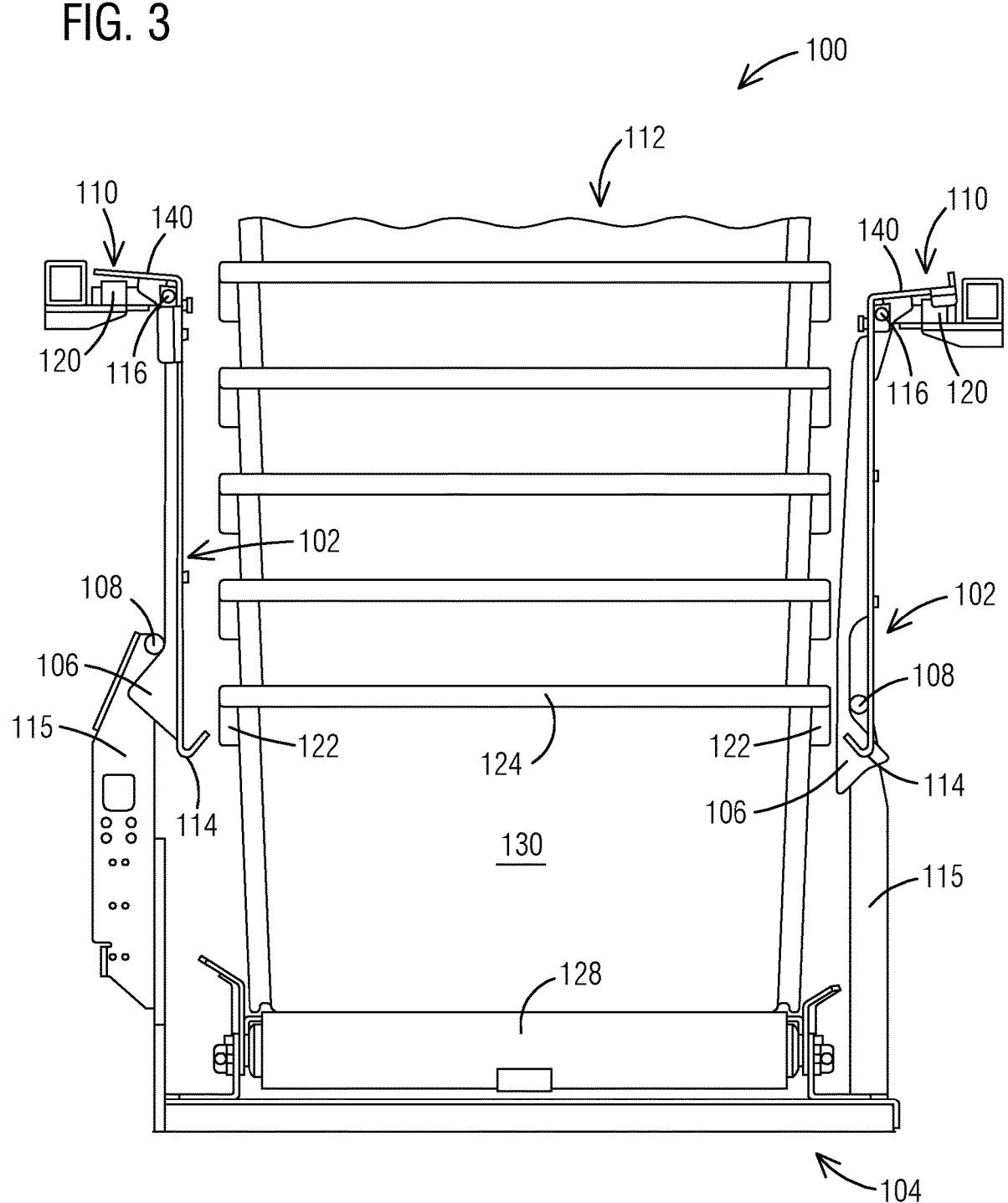

FIG. 1-3 illustrate key functional elements of a tote unstacking apparatus 100 according to an example embodiment. As shown, the apparatus 100 includes at least a first and a second stack retaining latch 102 arranged on first and second opposite sides of a tote stack 112 (see FIG. 3), a vertically movable lifting member 104, a cam 106 and a respective follower 108 arranged on each of the first and second sides, and holding mechanism 110. In the shown embodiment, the first and second latches 102 do not directly face each other but are eccentrically positioned on each side of the tote stack 112. The same is true for the cam and follower mechanism on either side. In other embodiments, a more symmetrical arrangement may be implemented. The tote stack 112 may represent as few as a single tote up to a maximum as is practical, particularly if stacks of nested totes are conveyed and stored within the overall system. Each stack retaining latch 102 comprises a fixed end and a movable end. The movable end defines an engagement portion 114 of the latch 102. The fixed end is pivoted about a pivot axis 116, such that the latch 102 is movable between an engaged position in relation to the tote stack 112, and a disengaged position. In the described configuration, the stack retaining latches 102 are configured such that they tend to return to the disengaged position when not acted on (for example, by the cam and follower mechanism and the holding mechanism, as explained below).

The cam 106 and the respective follower 108 interact to act on the latch 102 on each side, during vertical movement of the lifting member 104, to move the latch 102 into engagement with the tote stack 112. In the shown embodiment, each cam 106 is attached to a respective latch 102 on each side, such that each cam 106 and the respective latch 102 pivot about a common pivot axis 116. In the shown example, each cam 106 is a linear cam having a triangular profile. However, other arrangements and cam shapes may be employed. Each cam 106 is configured to be imparted motion upon interaction with the respective follower 108. When the cam 106 is imparted motion by the follower 108, both the cam 106 and the latch 102 are angularly displaced (rotated) about the pivot axis 116.

Each follower 108 may include, for example, a roller, which is mounted, in this case, to the lifting member 104 and thus movable vertically with the lifting member 104. In the shown embodiment, each follower 108 is mounted to a vertical arm 115 fixed to the lifting member 104 The follower 108 forms part of a modified double dwell cam mechanism that functions to provide precise intermittent motion to the cam 106 and the stack retaining latch 102. In other embodiments, the cam and follower arrangement may be reversed.

The holding mechanism 110 may be activated based on control signals from a controller 118 (shown in FIG. 1) to hold or maintain the latch 102 in the engaged position in relation to the tote stack 112. In the described embodiment, the holding mechanism 110 comprises an electromagnetic component 120 configured to act on the respective stack retaining latch 102 when activated. Each latch 102 may correspondingly comprise a magnetic material or a magnetic insert, at least in the portion 140 interfacing with the electromagnetic component 120. Use of an electromagnet enables the activation timing of the holding mechanism to be precisely controlled electronically. In other embodiments, the holding mechanism 110 may be implemented by a solenoid, or by pneumatic or hydraulic cylinders, among other techniques. In the shown example, the holding mechanism 110 is positioned at a fixed location proximate to the fixed end of each latch 102. The controller 118 may include, for example, a programmable logic controller (PLC), or any other type of controller capable of being programmed to control an activation timing of the holding mechanism 110 to control a dwell period of the latches 102.

The engagement portion 114 of each latch 102 is configured to mechanically interlock with a mating feature 122 designed into each tote. The mating feature 122 may be formed adjacent to a top end of each tote, on opposite sides, as shown in FIG. 3. Alternately, the mating feature 122 may be defined by the outermost lip 124 of each tote. In the shown example, the engagement portion 114 of each latch 102 has a hook-profile. In general, the engagement portion 114 may include any shape or arrangement so long as it is easily engageable and disengageable with the mating feature 122 on each tote. The shape of the mating feature 122 and the profile of the engagement portion 114 cause the weight of the tote stack 112 to actively hold the latches 102 engaged, providing a mechanical interlock function to keep the tote stack 112 suspended. The engagement portion 114 of each latch 102 engages with the lowermost tote in the tote stack 112 (that is not being separated), to retain the tote stack 112 in the suspended position. The stack retaining latches 102 may be sized to extend to a point that assures that the tote stack 112 is held at a desired height when the latches 102 are in the engaged position to fully support the tote stack 112. The mechanical interlock may be disengaged by raising the tote stack 112 by the lifting member 104 so that the engagement portion 114 of the latches 102 can clear the mating feature 122 on the lowermost tote. FIG. 3 shows the mechanical interlock in a disengaged position.

The lifting member 104 is movable in a vertical direction between a minimum height, wherein a tote can be removed, and a stack lifting height. The lifting member 104 is capable of lifting or lowering the tote stack 112 a distance exceeding the height of a single tote to allow that tote to be removed from the tote stack 112. More specifically, the lifting member 104 includes a base 128 that is arranged to engage the lowermost tote in the tote stack 112 when the tote stack 112 is supported by the latches 102. The lifting member 104 is movable vertically upwards to disengage the lowermost tote as will be discussed with regard to FIG. 5-10. The lifting member 104 is further movable downward the full height of the tote to allow movement of a separated tote 130 in a horizontal direction or a direction normal to a stack axis of the tote stack 112 and away from the tote stack 112, as will be described with regard to FIG. 12. The lifting member 104 may move in response to hydraulic actuation, pneumatic actuation, electrical drive motors or any other suitable actuation system.

FIG. 2 illustrates a scenario where a tote 130 is being separated from the tote stack 112 and moving downward with respect to the tote stack 112. In one embodiment, as shown in FIG. 2, separating mechanisms 132 may be provided for ensuring separation of the tote 130 being unstacked from the tote stack 112. In the shown example, each separation mechanism 132 attaches to the lifting member 104 and moves vertically with the lifting member 104. Each separation mechanism 132 includes a vertical arm 134 sized to position a pivoting, spring-biased latch pawl 136 so that the pawl 136 may pass freely over the outermost lip 124 of the tote 130 being unstacked as the lifting member 104 is raised. As the pawl 136 passes the edge of the lip 124, it is rotated by the bias spring into a latching position such that the pawl 136 engages the lip 124 and does not pass across the lip 124 of the tote 130 being separated as the lifting member 104 is lowered. This arrangement ensures the separation of the tote 130 being unstacked from the tote stack 112. In other embodiments, the separation mechanism may be obviated by relying on the weight of the tote 130 being separated. However, a separation mechanism may be useful in many applications to address any interference in the tote stack 112 that prevents the tote 130 being separated from falling off by virtue of its weight alone.

FIG. 3 illustrates the components of the modified double dwell cam mechanism that controls the stack retaining latches 102. As the lifting member 104 lowers, the tote stack 112 lowers, as do the cam followers 108. The cams 106 and latches 102 are shown in the inactive dwell state (disengaged). Further lowering of the lifting member 104 from the point shown in FIG. 3 causes the followers 108 to lower, which forces the cams 106 and latches 102 to rotate away from the inactive dwell position to the active dwell position (engaged position) where the latches 102 engage the tote stack 112 at the next tote above the tote 130 being separated.

Figure 4:
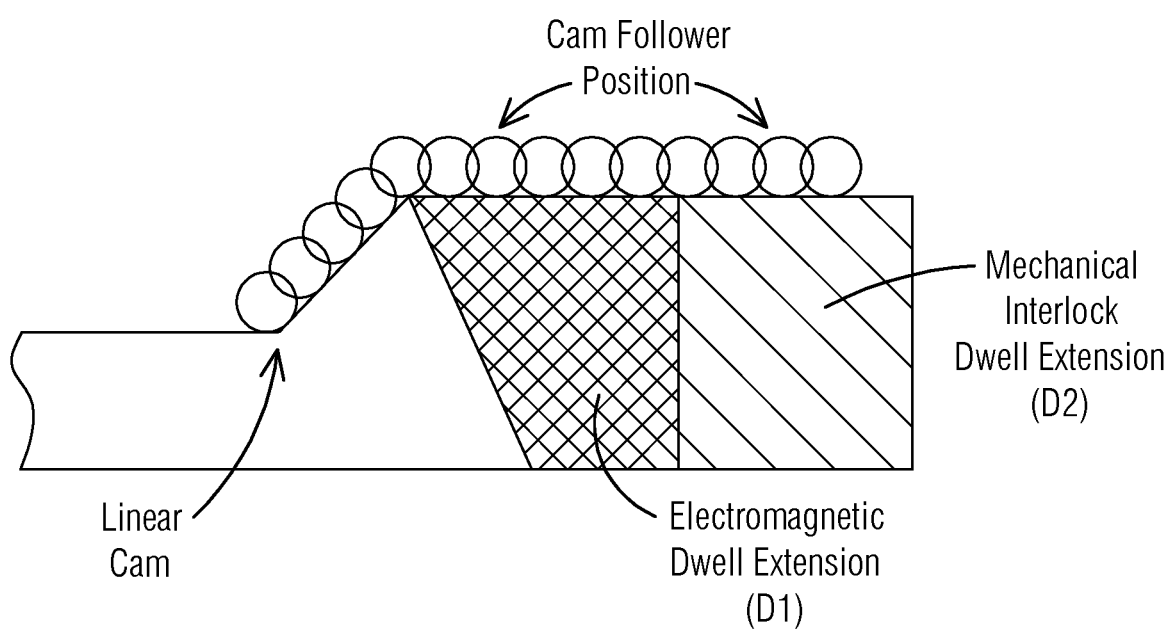
FIG. 4 is a schematic illustration of an extension of active dwell of a cam and follower mechanism in a tote unstacking cycle by way using electromagnets and mechanical interlocking features according to an exemplary embodiment.

To enhance operation, the active dwell position is extended by two features, as illustrated in FIG. 4. First, electromagnetic components 120 which are energized by control signals from the controller 118 extend the active dwell position. The electromagnetic components 120 are energized or remain energized when each cam 106 passes and separates from the respective follower 108, to hold the stack retaining latches 102 in the engaged position. This first period of active dwell extension is indicated by the interval D1 in FIG. 4. Active dwell is also extended by the mechanical interlock between the mating feature 122 in the totes and the engagement portion 114 of each latch 102, by which the weight of the tote stack 112 holds the latches 102 engaged. This second period of active dwell extension is indicated by the interval D2 in FIG. 4.

In one embodiment, the controller 118 may be configured to activate the holding mechanism 110 (e.g., the electromagnetic components 120) at or before a point in time when the cams 106 lose contact with the respective followers 108 in an unstacking cycle. Furthermore, the controller 118 may be configured to deactivate holding mechanism 110 (e.g., the electromagnetic components 120) at or before a point in time when each latch 102 interlocks with the mating feature 122 on the next tote (above the tote being separated) in the unstacking cycle. Although the timing for deactivation of the electromagnetic component 120 may not be of critical importance, appropriately controlling a deactivation timing of the electromagnetic component 120 may be beneficial in minimizing residual magnetism in the magnetic components. In one embodiment, the controller 118 may be programmed to control the activation and deactivation timings of the holding mechanism 110 as a function of a position (i.e., vertical height) of the lifting member 104 in the unstacking cycle. The controller 118 may thus operate the lifting member 104 and the holding mechanism 110 in a manner that synchronizes the activation and deactivation timings of the holding mechanism 110 to the movement of the lifting member 104. This ensures that the position of the latches 102 is tightly controlled based on the height of the lifting member.

An unstacking cycle is now described referring sequentially to FIG. 5-10.

Figure 5:
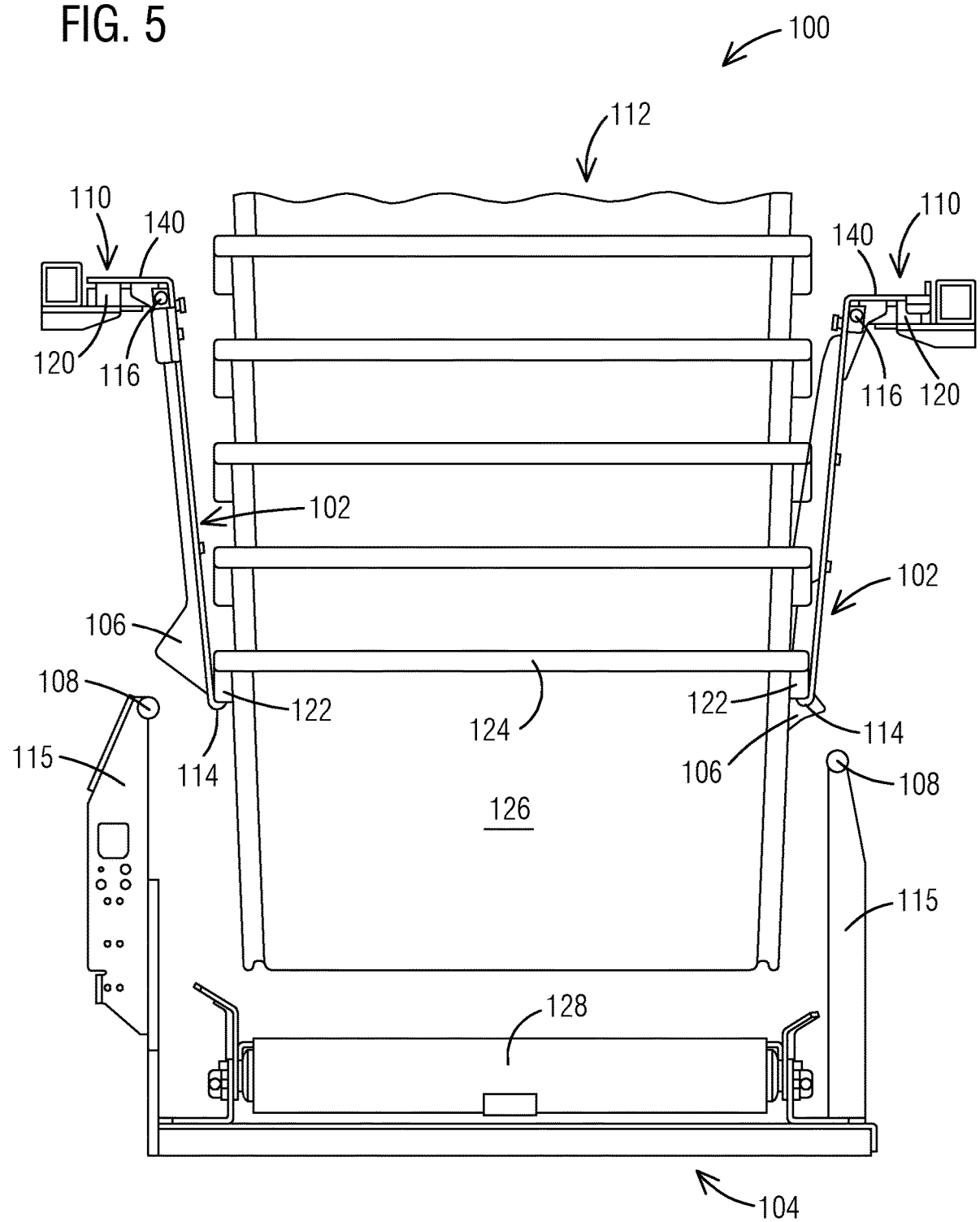
FIG. 5 through FIG. 10 illustrate an example sequence of states in a tote unstacking cycle.

In the state shown in FIG. 5, the tote stack 112 is retained by the stack retaining latches 102 in a suspended position at a desired height. The latches 102 are engaged with the lowermost tote 126 in the tote stack 112 by the mechanical interlock between the engagement portion 114 of the respective latch 102 and the mating feature 122 of the tote 126. The lifting member 104 is positioned below the tote stack 112.

Figure 6:
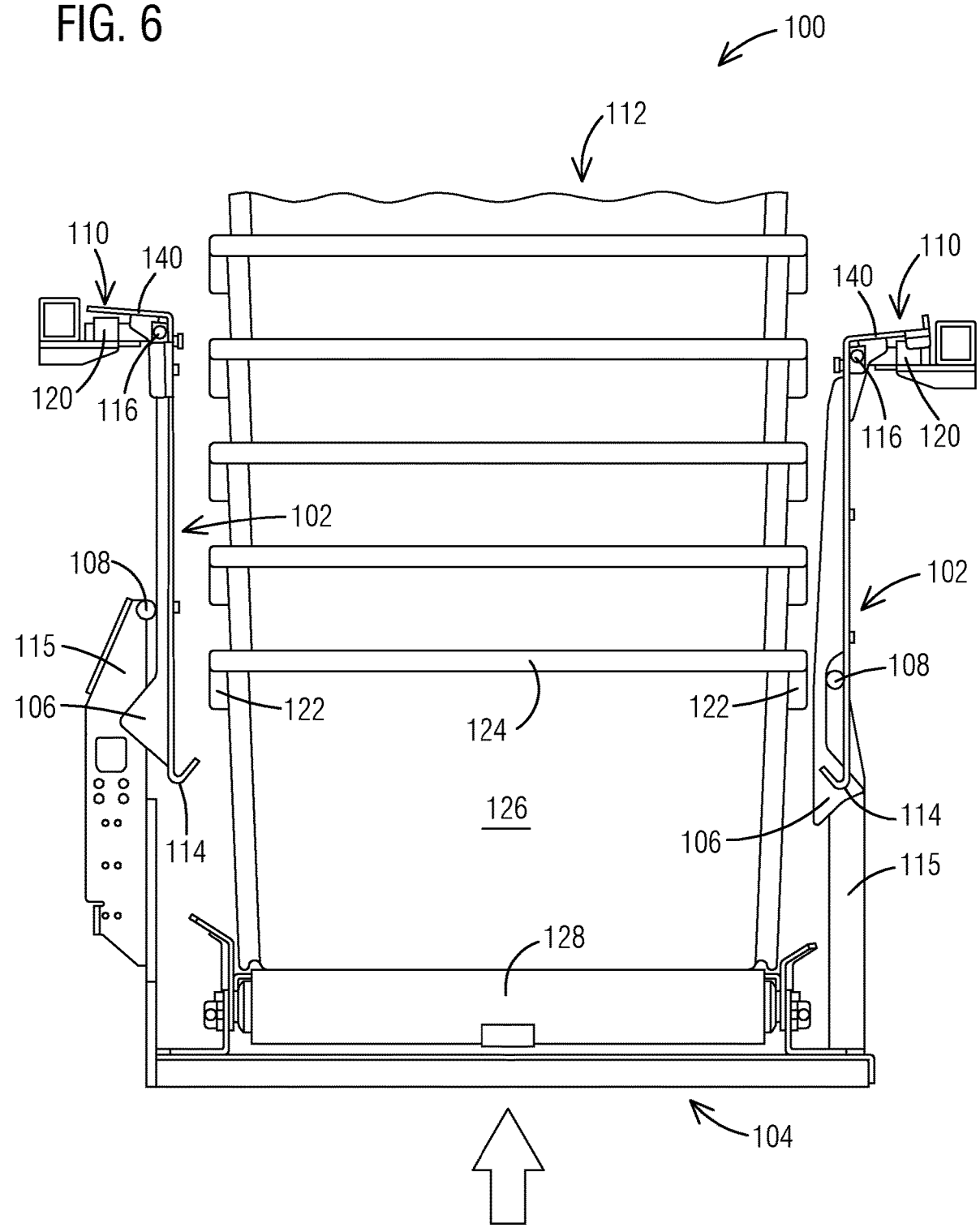

Next, as shown in FIG. 6, the lifting member 104 is raised, such that the base 128 of the lifting member 104 engages with the bottom of the lowermost tote 126. As the lifting member 104 is raised beyond the point of engagement with the lowermost tote 126, the pawls 136 of the separating mechanism 132 (not visible in the view of FIG. 5-10) pass over the outermost lip 124 of the lowermost tote 126 and the latches 102 disengage or snap out of the mechanical interlock. At this time, the holding mechanism remains inactive, whereby the latches 102 return (rotate back) to the disengaged position, as shown in FIG. 6.

Figure 7:
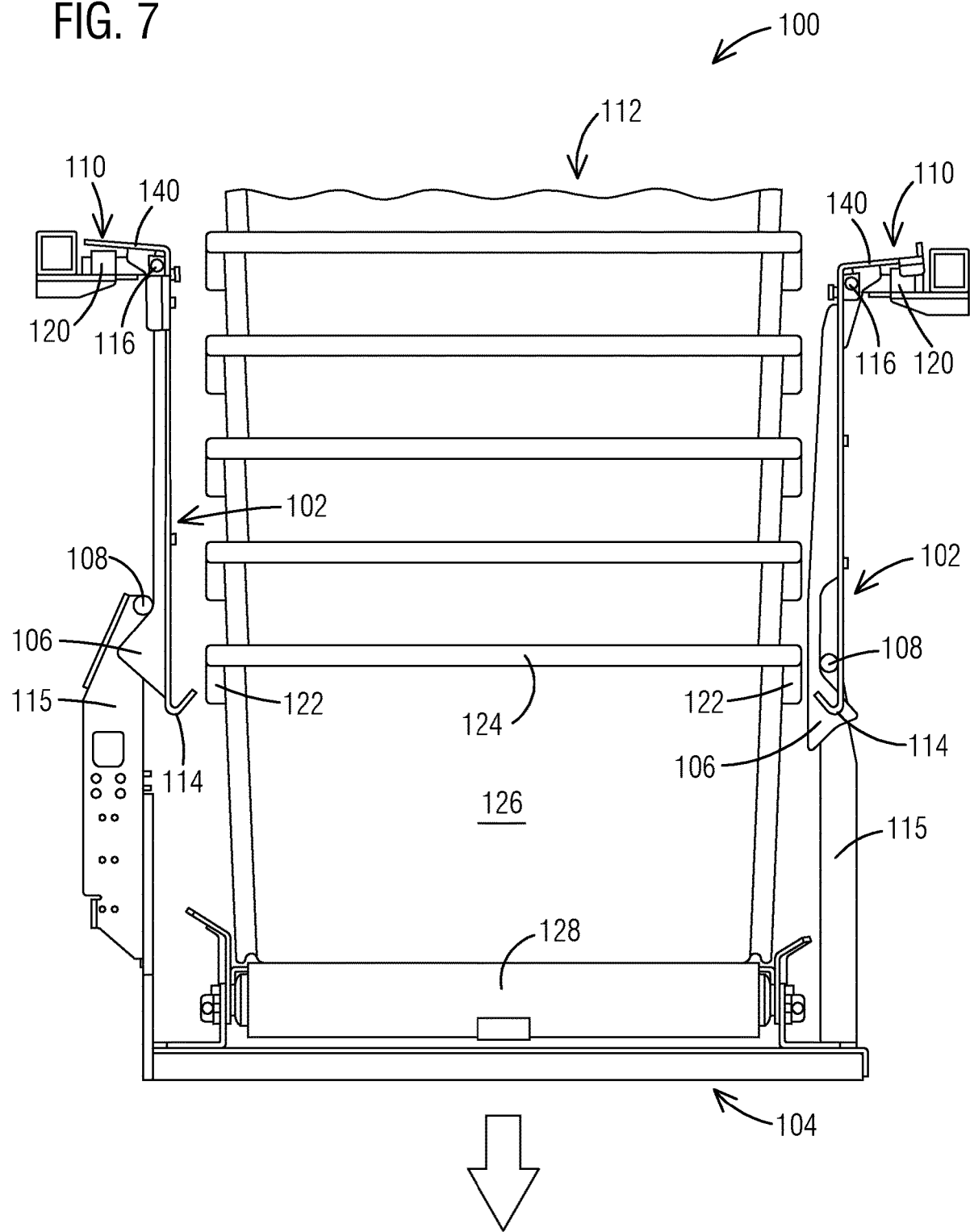

The lifting member 104 is next lowered, as shown in FIG. 7. As the lifting member 104 lowers, each of the followers 108 engage with the respective cam 106 and starts to interact therewith to begin moving the latches 102 toward the tote stack 112 (moves out of the inactive dwell state). However, at this point, the cams 106 and the respective followers 108 are positioned to assure that the attachment point for the lowermost tote 126 passes the latches 102 before the latches 102 reach engagement position with the next tote 138, in a subsequent step.

Figure 8:
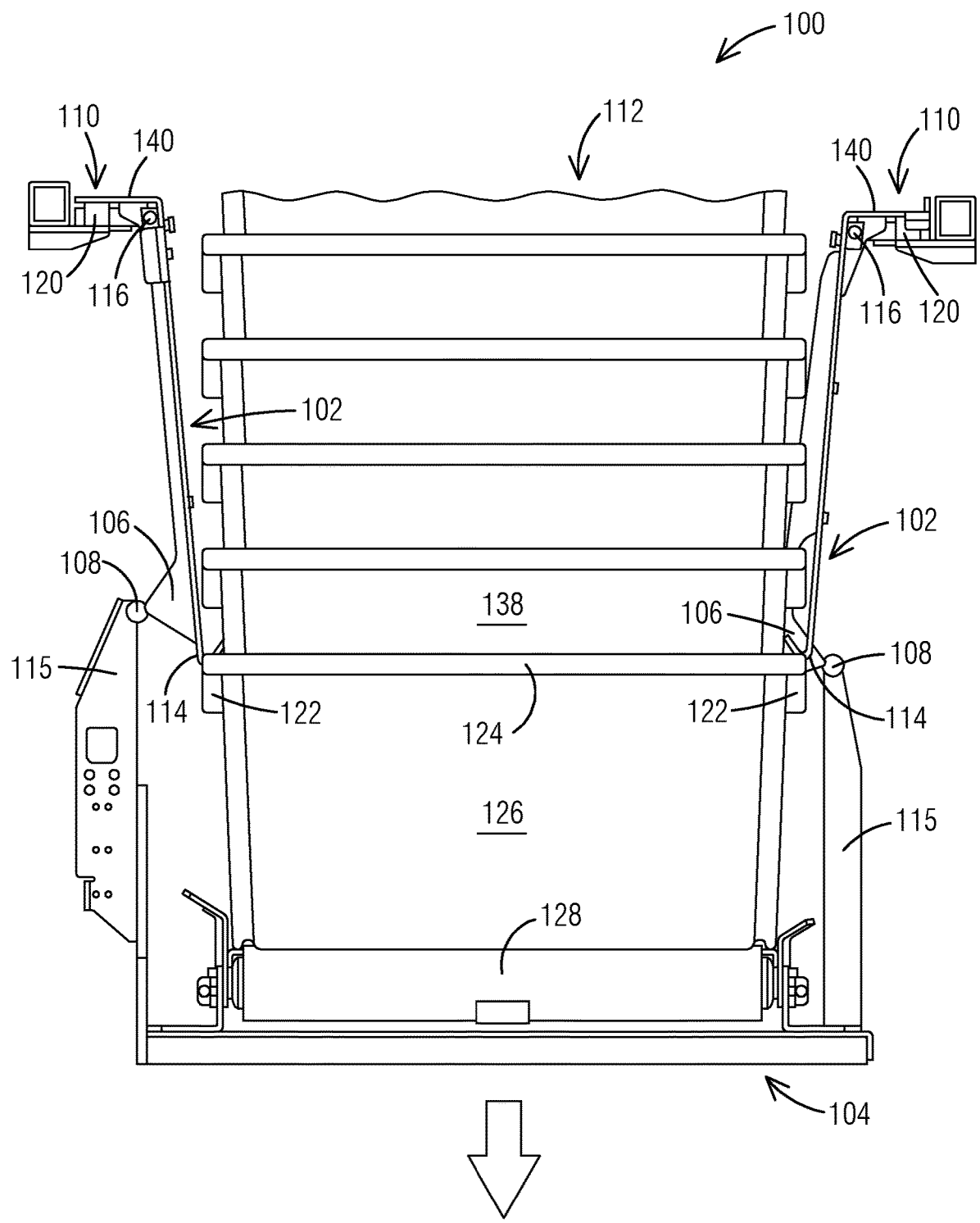

Continued lowering of the lifting member 104 up to a first distance, shown in FIG. 8, causes further displacement of the latches 102 toward the engagement position, as the followers 108 continue to move the cams 106. FIG. 8 illustrates the maximum displacement point (the active dwell position) at which the latches 102 are at the point of engagement with the next tote 138 that immediately follows the lowermost tote 126. The electromagnetic components 120 are activated at this point (or slightly earlier) to maintain the latches 102 in this engaged position and extend the active dwell past the end of the cams 106 as the lifting member 104 is subsequently lowered beyond the first distance (maximum displacement point).

Figure 9:
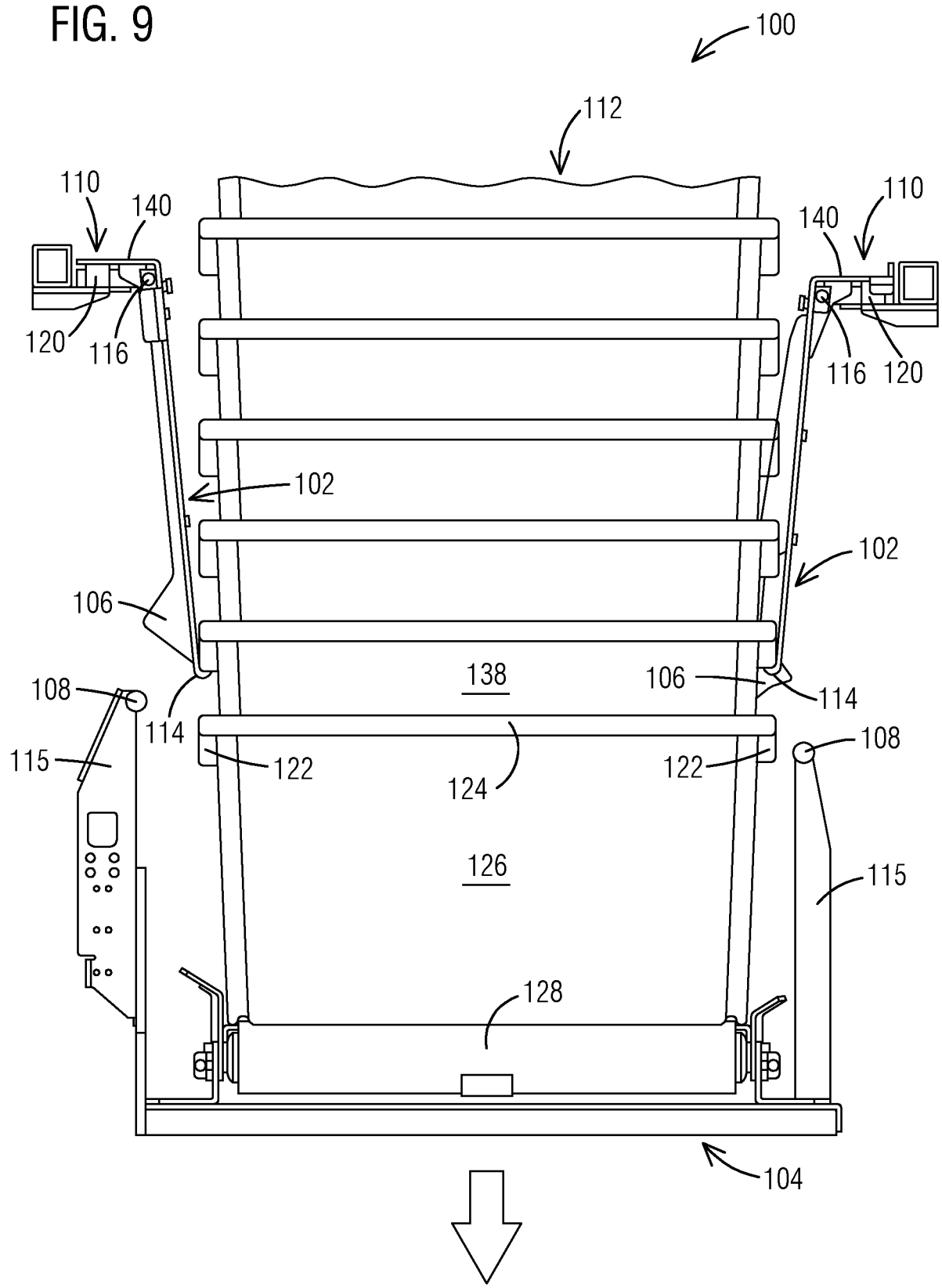

FIG. 9 illustrates the tote stack 112 after it has been lowered beyond the first distance to a point where the latches 102 reach the interlocking features 122 in the next tote 138 above the lowermost tote 126. At this point, the followers 108 have disengaged the cams 106 completely and the electromagnetic components 120 have been deactivated. The shape of the engagement portion 114 of the latches 102 maintains engagement with the new lowermost tote 138 such that the tote stack 112 is retained at the same height as it was prior to the removal of the previous lowermost tote 126.

At some point during the continued lowering of the lifting member 104, the separating mechanisms 132 may engage the outermost lip 124 of the lowermost tote 126, to physically separate the lowermost tote 126 from the tote stack 112. Alternately, the lowermost tote 126 may fall off by its own weight when the remainder of the tote stack 112 is retained by the latches 102.

Figure 10:
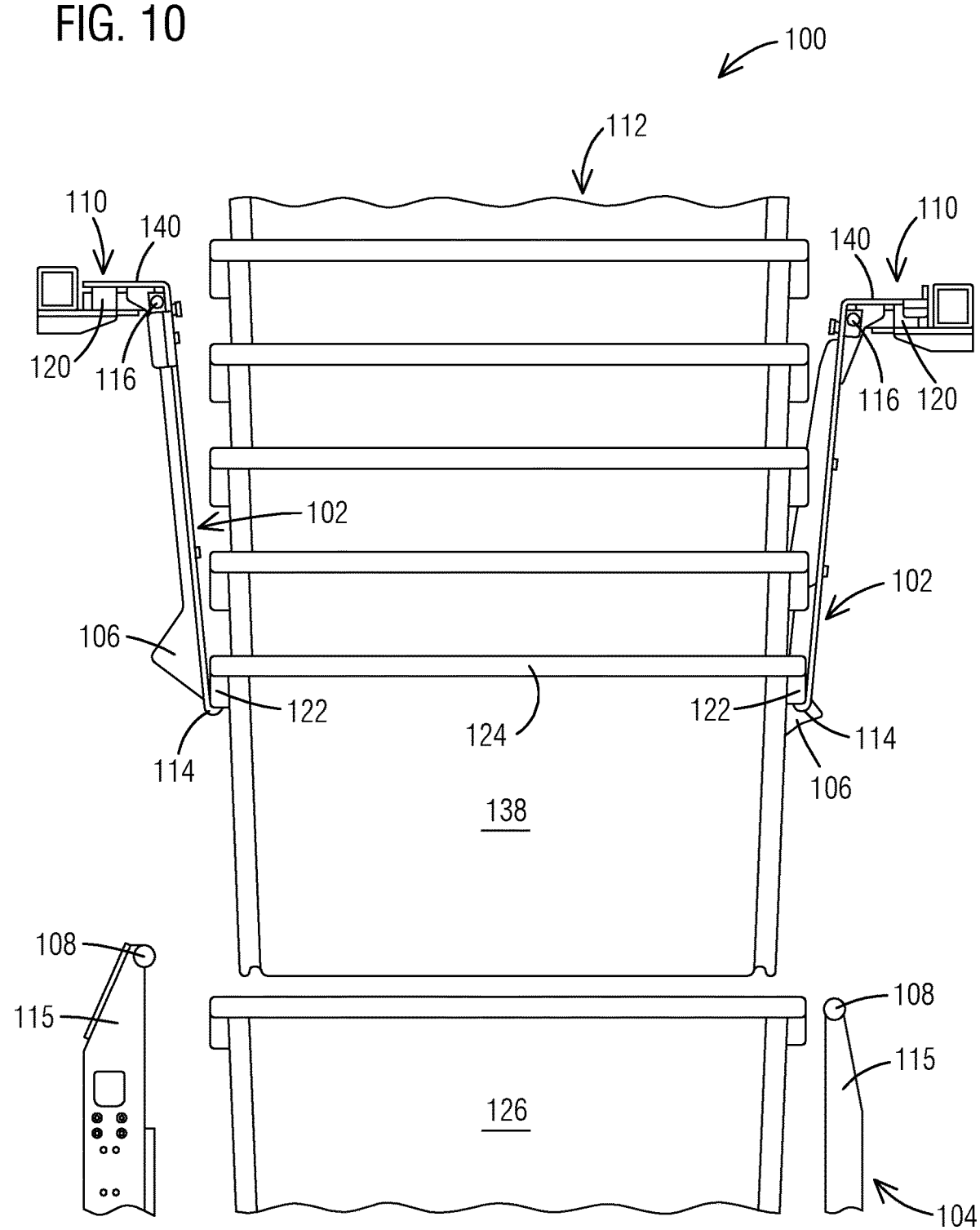

Finally, as shown in FIG. 10, the lifting member 104 reaches the bottommost position, having separated the lowermost tote 126 from the tote stack 112. At the bottommost position of the lifting member 104, the entire lowermost tote 126 is positioned lower than a lowest point in the remainder of tote stack 112. The separated tote 126 can be conveyed out of the lifting member 104 in a horizontal direction after this point. Once the lifting member 104 is clear, the above-described unstacking cycle may be repeated.

Figure 11:
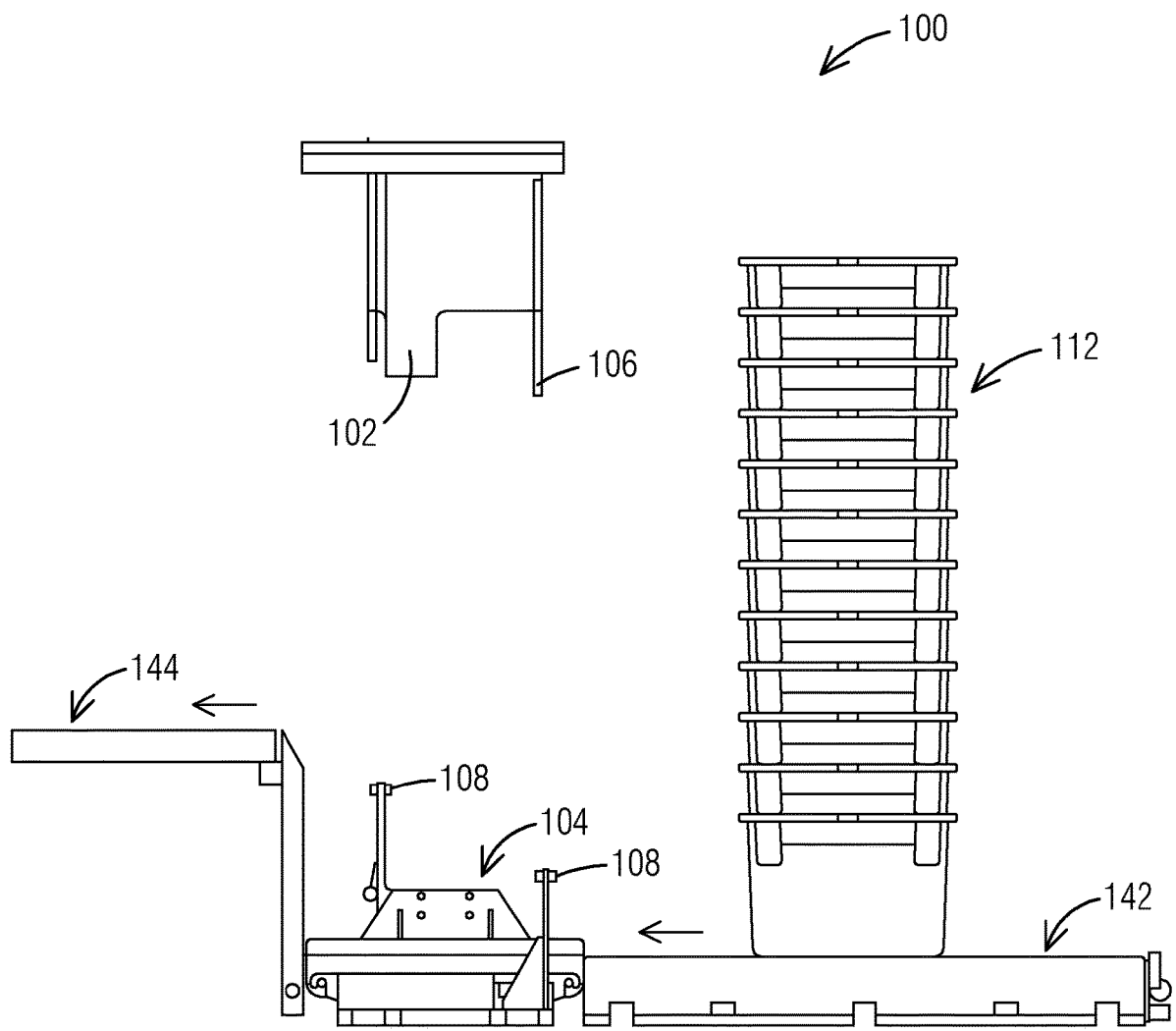
FIG. 11 illustrates a stack of totes being received via an incoming conveyor for unstacking.
Figure 12:
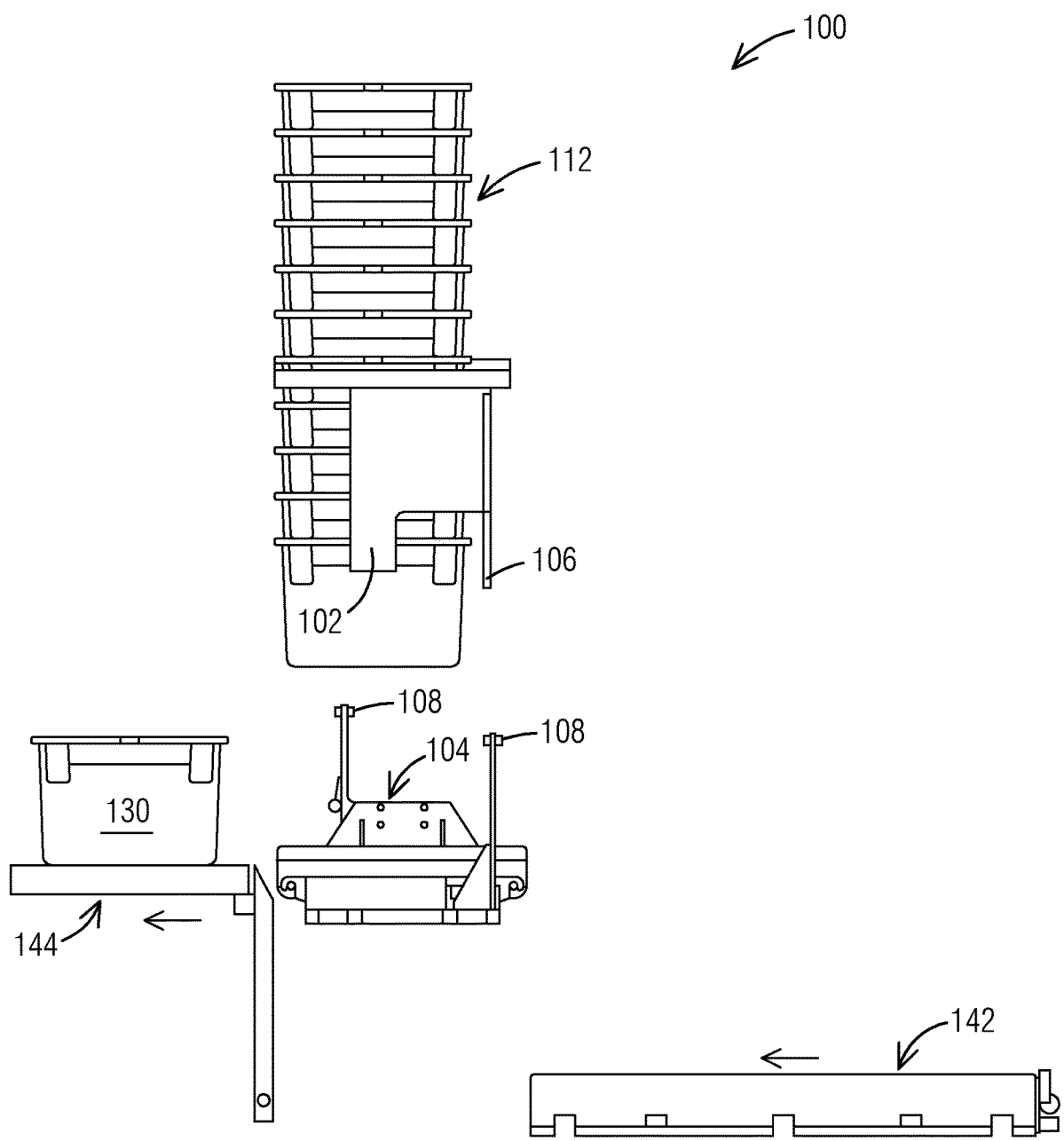
FIG. 12 illustrates a separated tote from the stack of totes being discharged via an outgoing conveyor.

FIGS. 11 and 12 illustrate an exemplary configuration of portion of a material handling system including the described unstacking apparatus 100. It is to be noted that the view shown in FIG. 11-12 is orthogonal to the view shown in FIG. 5-10.

As shown in FIG. 11, the lifting member 104 may be movable to interface with an incoming conveyor 142 to receive a tote stack 112 prior to the commencement of the unstacking cycles. Once the tote stack 112 is received, the lifting member 104 may raise the tote stack 112 to the suspension height such that the tote stack 112 is retained by the latches 102 engaging the lowermost tote in the tote stack 112 using the cam and follower mechanism, holding mechanism and the mechanical interlock feature.

As shown in FIG. 12, the lifting member 104 may be further movable to interface with an outgoing conveyor 144 to discharge a separated tote 130 after each unstacking cycle, prior to commencing the next unstacking cycle. In one embodiment, as shown, the incoming conveyor 142 and the outgoing conveyor 144 are positioned at different vertical heights and on opposite sides of the lifting member 104. In other embodiments, the incoming conveyor 142 and the outgoing conveyor 144 may be positioned at different vertical heights but on the same side of the lifting member 104. In still other embodiments, the incoming conveyor 142 and the outgoing conveyor 144 may be positioned at the same height, on opposite sides of the lifting member 104.

A tote stacking apparatus and a corresponding method is illustrated referring to FIG. 13-22.

Figure 13:
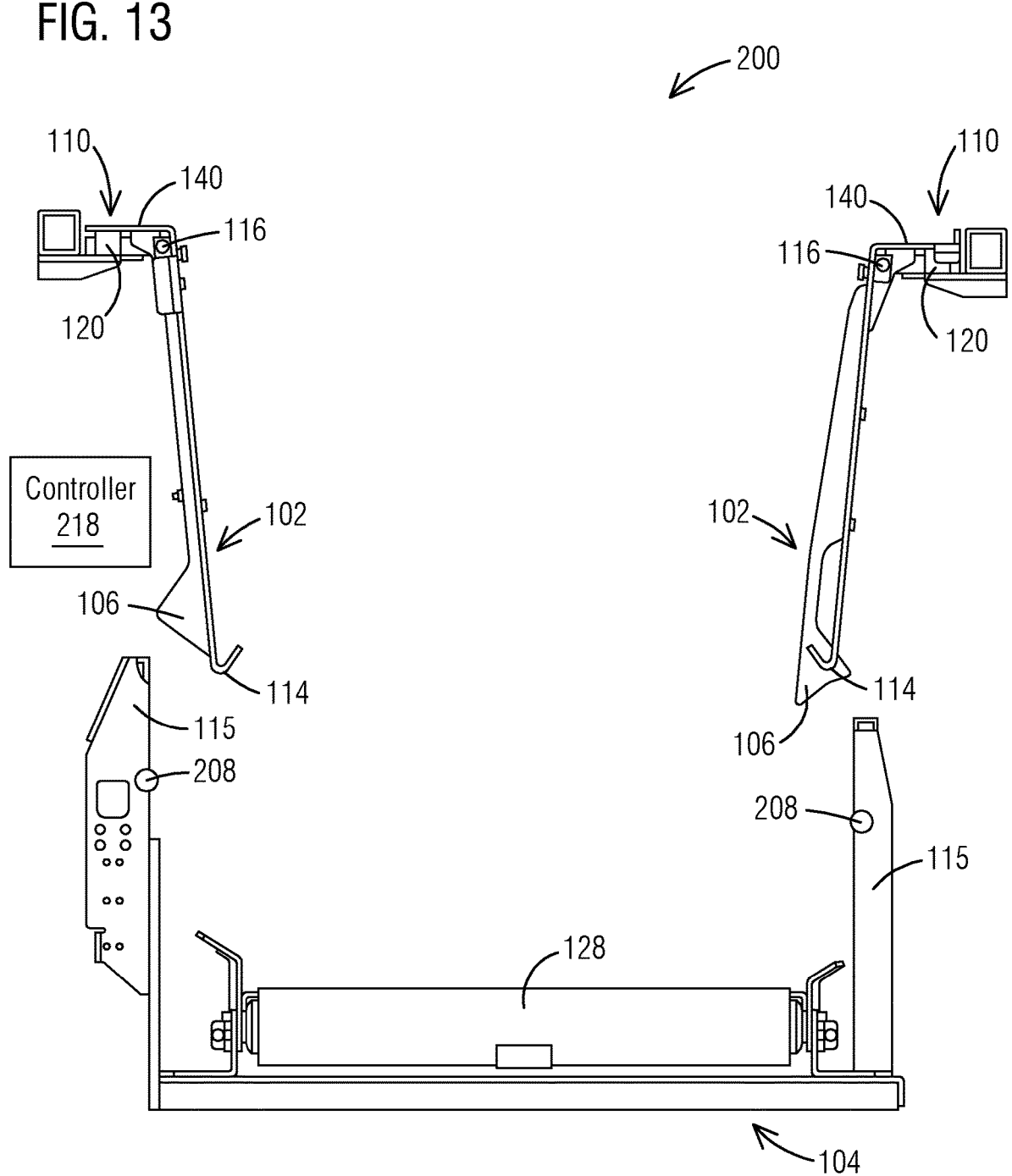
FIG. 13 is an end view of an apparatus for stacking totes, according to an embodiment of the disclosure.

FIG. 13 illustrates key elements of a tote stacking apparatus 200 according to an example embodiment. The stacking apparatus 200 of the illustrated embodiment is largely similar to the unstacking apparatus 100 described above, except for a few differences that are enumerated below. In the following description of the stacking apparatus 200 and the associated method, reference numerals denoting like elements are retained from the description of the unstacking apparatus 100 and the associated method, and the description of such like elements will not be repeated, for the sake of brevity.

A first difference lies adapting the cam and follower mechanism to execute the latch engagement timings (active dwell) associated with the stacking cycle, which differs from that of the unstacking cycle. In one embodiment, this difference may boil down to simply a change in height of the followers, keeping the cams unchanged. As shown in FIG. 13, the followers 208 used in the stacking apparatus 200 are moved to a lower position than the followers 108 used in the unstacking apparatus 100 (see FIG. 1 for comparison). The positions of the followers 108 of the unstacking apparatus 100 and the followers 208 of the stacking apparatus 200 differ by a distance equal to a pitch distance of the tote stack. In another embodiment, the same effect may be achieved by changing the height of the vertical arms 115 on which the followers are mounted by the same distance. In still other embodiments, instead of the followers, the cams may be modified to adapt to a stacking cycle. A second difference lies in adapting the controller to control the activation timings (extension of active dwell) associated with the stacking cycle, which differs from that of the unstacking cycle. For clarity of understanding, the modified controller of the stacking apparatus 200 is denoted by the reference numeral 218, it being understood that the modification required is not necessarily related to the hardware but on the programming of the controller. A third difference lies in removing the separating mechanism in the stacking apparatus 200. Thus, in one embodiment, a tote accumulator in accordance with the present disclosure may be modifiable on site for being used either as an unstacking apparatus 100 or as a stacking apparatus 200.

Figure 14:
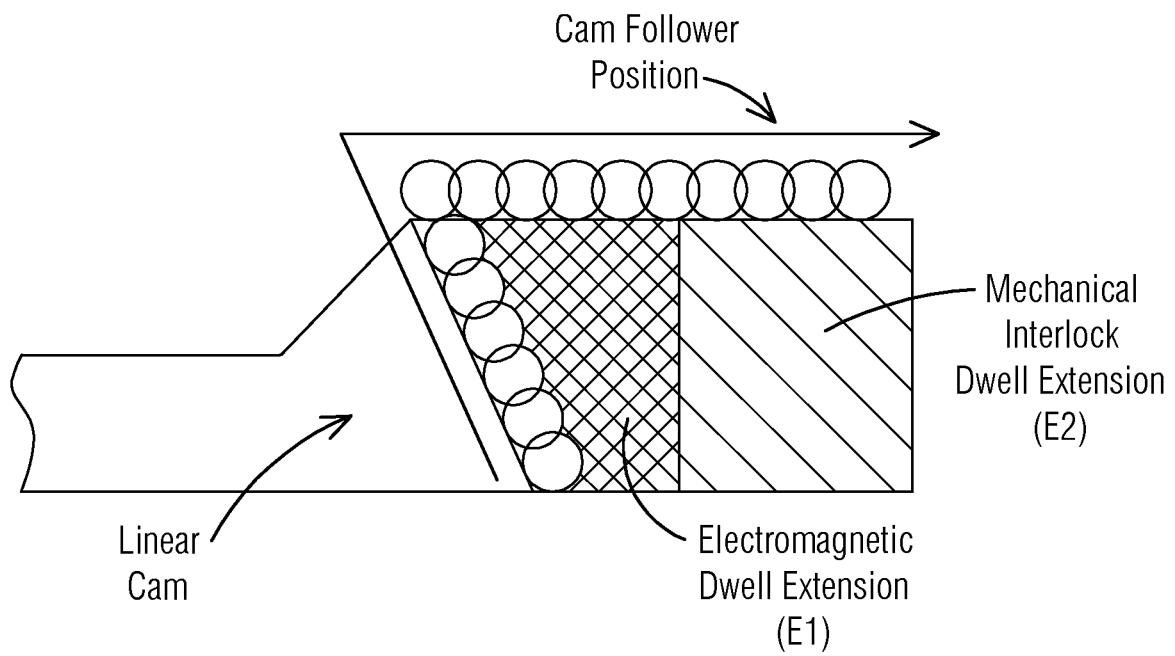
FIG. 14 is a schematic illustration of an extension of active dwell of a cam and follower mechanism in a tote stacking cycle by way using electromagnets and mechanical interlocking features according to an exemplary embodiment.

In the stacking cycle, similar to the unstacking cycle, the active dwell position is extended by two features, as illustrated in FIG. 14. First, electromagnetic components 120 which are energized by control signals from the controller 218 extend the active dwell position. The electromagnetic components 120 are energized or remain energized when each cam 106 separates from the respective follower 208, to hold the stack retaining latches 102 in the engaged position. Each cam 106 and the respective follower 208 engage at a lowermost point on the cam 106 as the follower 208 moves upward. The cam 106 and the follower 208 separate when the follower 208 begins moving downward at or shortly after the instant when it reaches the point of maximum displacement on the cam (apex of the triangular shape of the cam). This first period of active dwell extension is indicated by the interval E1 in FIG. 14. Active dwell is also extended by the mechanical interlock between the mating feature 122 in the totes and the engagement portion 114 of each latch 102, by which the weight of the tote stack 112 holds the latches 102 engaged. This second period of active dwell extension is indicated by the interval E2 in FIG. 14.

In one embodiment, the controller 218 may be configured to activate the holding mechanism 110 (e.g., the electromagnetic components 120) at or before a point in time when the cams 106 lose contact with the respective followers 208 in a stacking cycle. Furthermore, the controller 218 may be configured to deactivate holding mechanism 110 (e.g., the electromagnetic components 120) at or before a point in time when each latch 102 interlocks with the mating feature 122 a freshly added tote in the stacking cycle. Although the timing for deactivation of the electromagnetic component 120 may not be of critical importance, appropriately controlling a deactivation timing of the electromagnetic component 120 may be beneficial in minimizing residual magnetism in the magnetic components. In one embodiment, the controller 218 may be programmed to control the activation and deactivation timings of the holding mechanism 110 as a function of a position (i.e., vertical height) of the lifting member 104 in the stacking cycle. The controller 218 may thus operate the lifting member 104 and the holding mechanism 110 in a manner that synchronizes the activation and deactivation timings of the holding mechanism 110 to the movement of the lifting member 104. This ensures that the position of the latches 102 is tightly controlled based on the height of the lifting member 104.

A stacking cycle is now described referring sequentially to FIG. 15-20. The described stacking cycle involves adding a fresh tote 230 to a tote stack 112.

Figure 15:
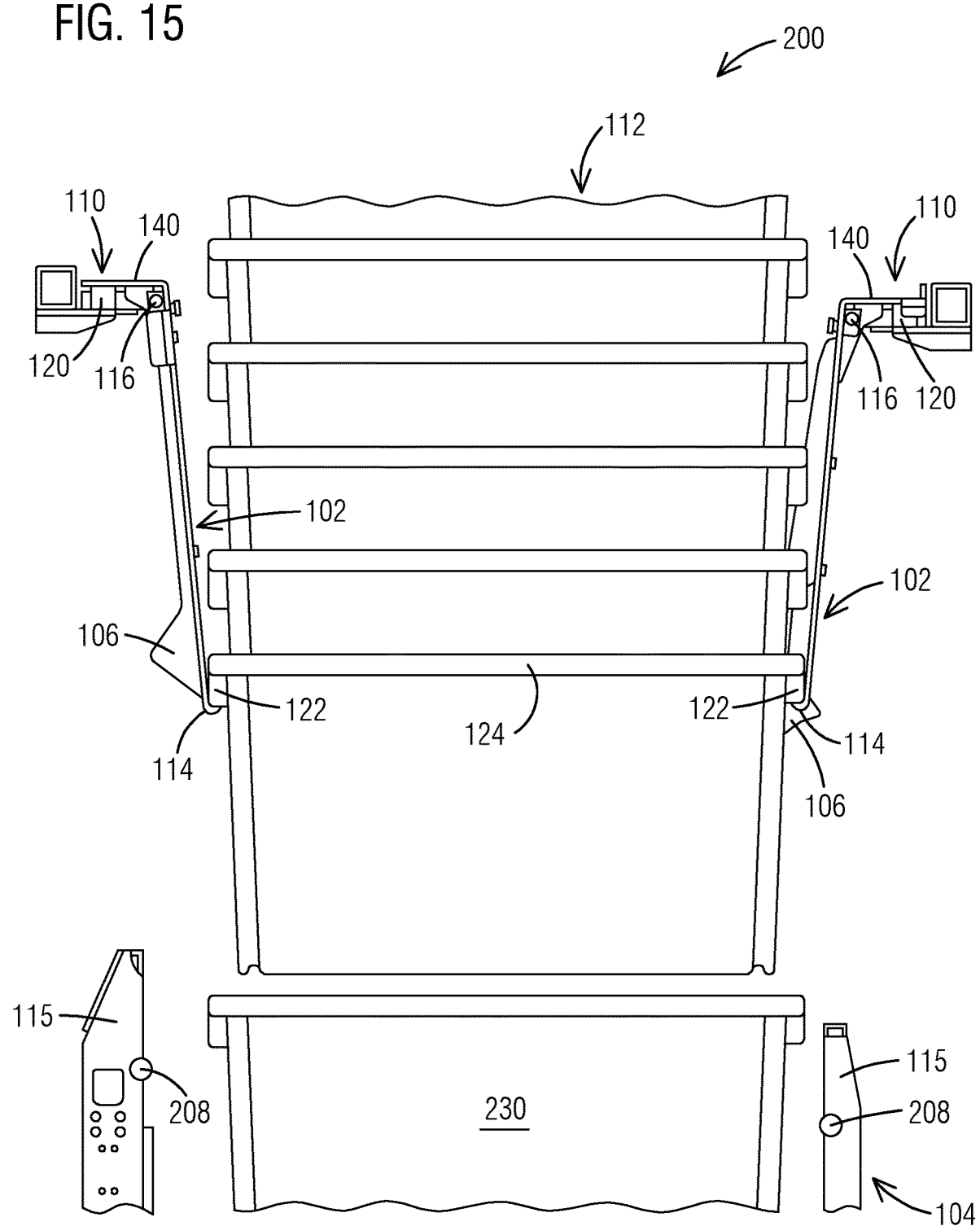
FIG. 15 through FIG. 20 illustrate an example sequence of states in a tote stacking cycle.
Figure 21:
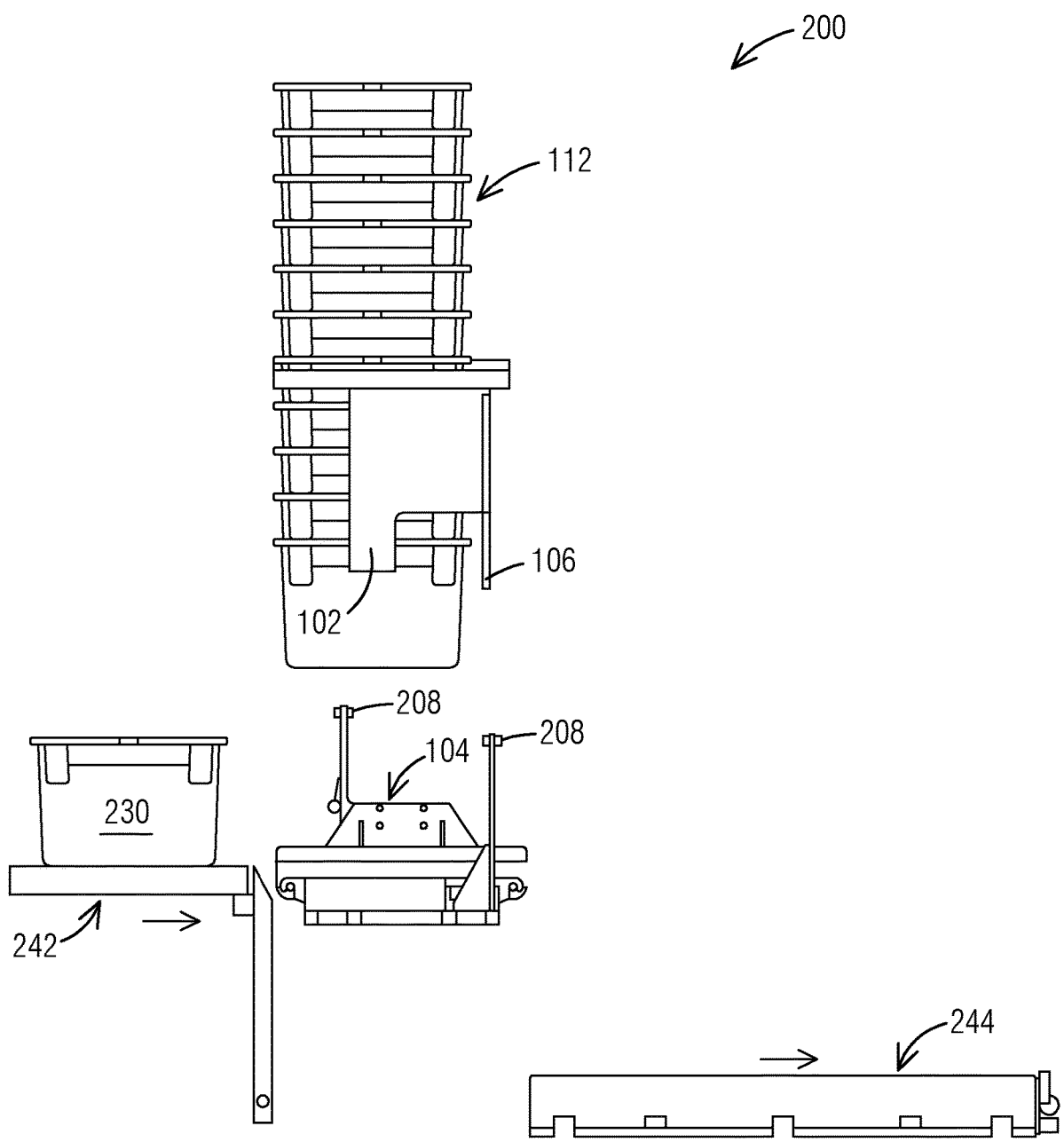
FIG. 21 illustrates a fresh tote being received via an incoming conveyor for stacking.

In the state shown in FIG. 15 a fresh tote 230 is received by the lifting member 104, for example, from an incoming conveyor 242 (see FIG. 21). At this point, the fresh tote 230 is physically separated from the tote stack 112. The latches 102 are engaged with the lowermost tote in the tote stack 112, with the engagement portion 114 of each latch 102 being mechanically interlocked with a mating feature 122 on the lowermost tote to retain the tote stack 112 in suspension at a desired height.

Figure 16:
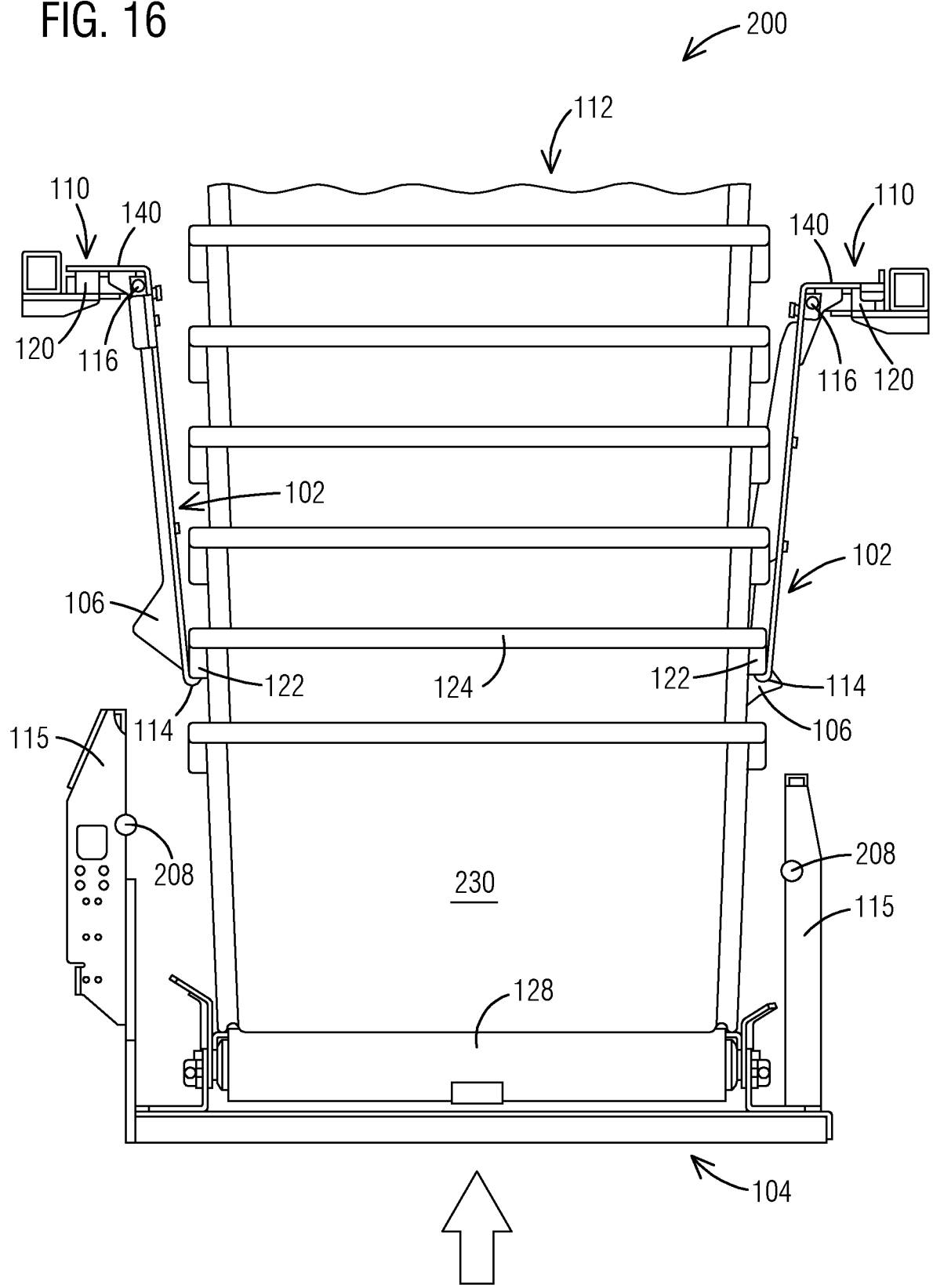

Next, as shown in FIG. 16, the lifting member 104 is raised to move the fresh tote 230 upward into engagement with the tote stack 112. At this point, the latches 102 remain in the interlocked position.

Figure 17:
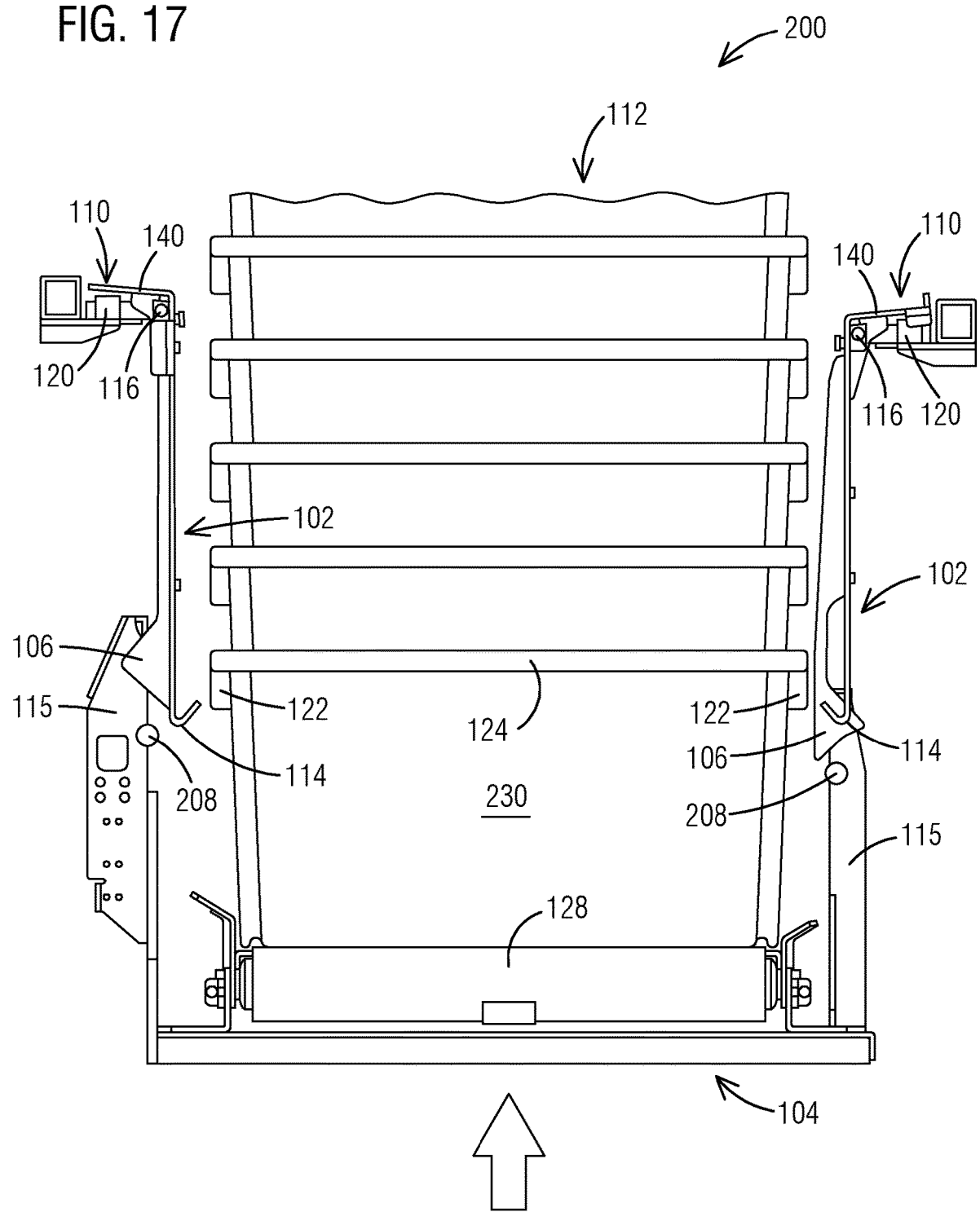

Upon further raising of the lifting member 104, the latches 102 disengage or snap out of the mechanical interlock, as shown in FIG. 17. At this time, the holding mechanism 110 remains inactive, or is deactivated, whereby the latches 102 return (rotate back) to their disengaged position. Note that the cams 106 and the respective follower 208 have still some distance to go before they engage (consequent to the modification of the follower), which allows the fresh tote 230 to pass the latches 102 as it is moved upward by the lifting member 104. At a subsequent point during the upward movement, the cams 106 engage the respective followers 208 and start to interact therewith, which begins to move the latches 102 toward engaging with the fresh tote 230 (moves out of inactive dwell).

Figure 18:
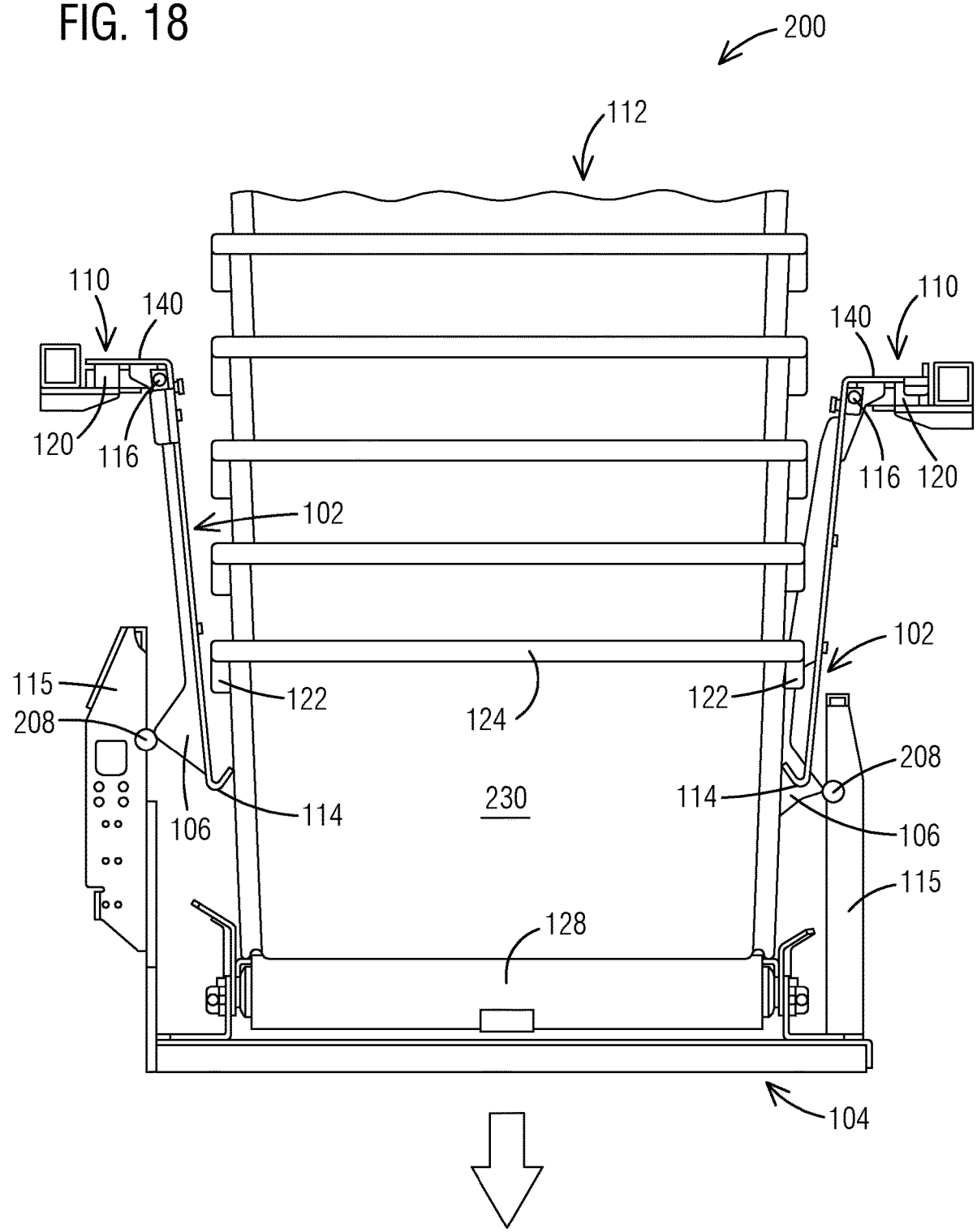

FIG. 18 illustrates a maximum displacement point at which the latches 102 are at the point of engagement with fresh tote 230. The electromagnetic components 120 are activated at this point (or slightly earlier) to maintain the latches 102 in this engaged position and extend the active dwell past the end of the cams 106 as the lifting member 104 is subsequently lowered such that the cams 106 cease to interact with the respective followers 208.

Figure 19:
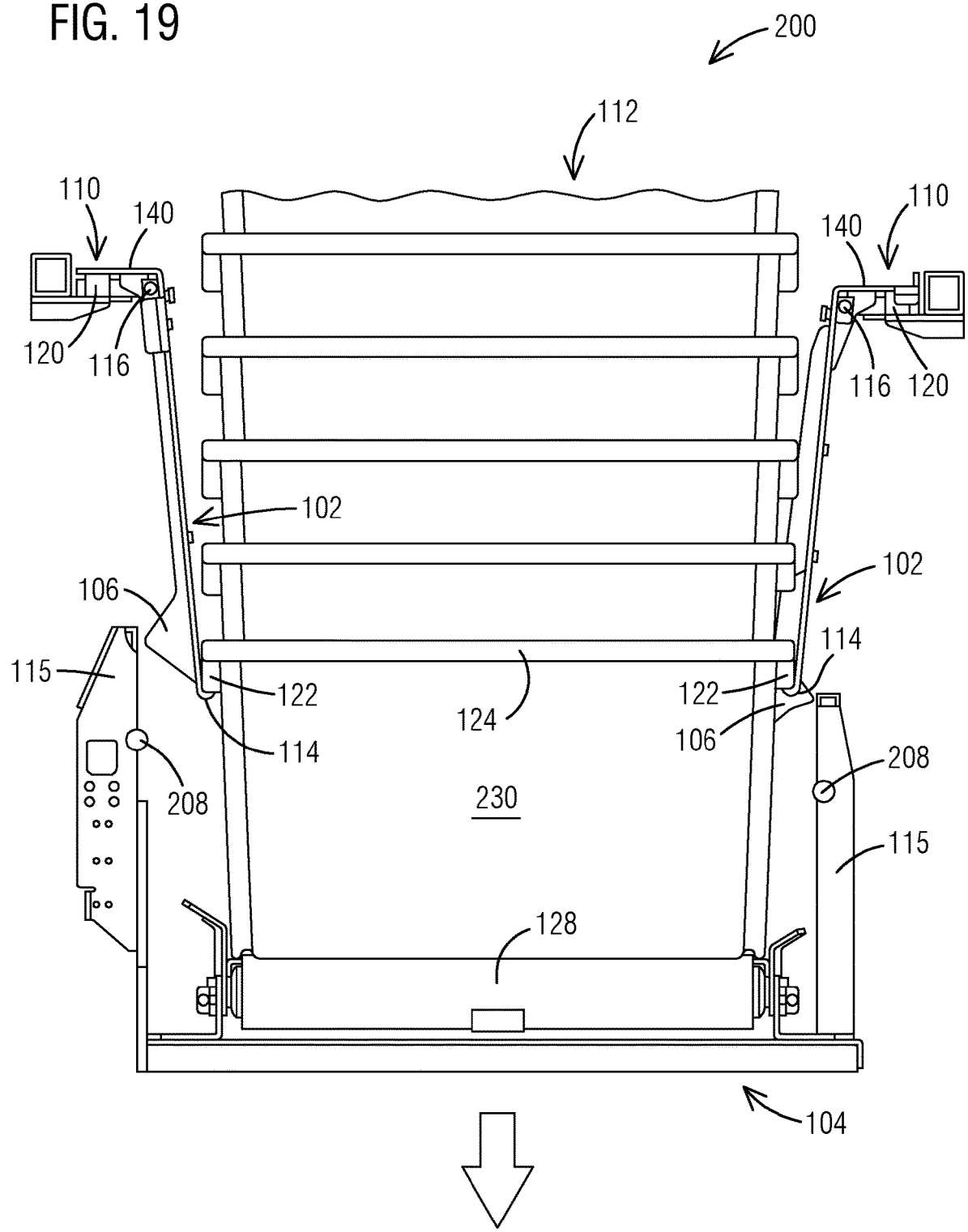

FIG. 19 illustrates the tote stack 112 after it has been lowered to a point where the latches 102 reach the interlocking features 122 on the fresh tote 230. At this point, the followers 208 have disengaged the cams 106 completely and the electromagnetic components 120 have been deactivated. The shape of the engagement portion 114 of the latches 102 maintains engagement with the fresh tote 230 such that the tote stack 112 is retained at the same height as it was prior to the addition of the fresh tote 230.

Figure 20:
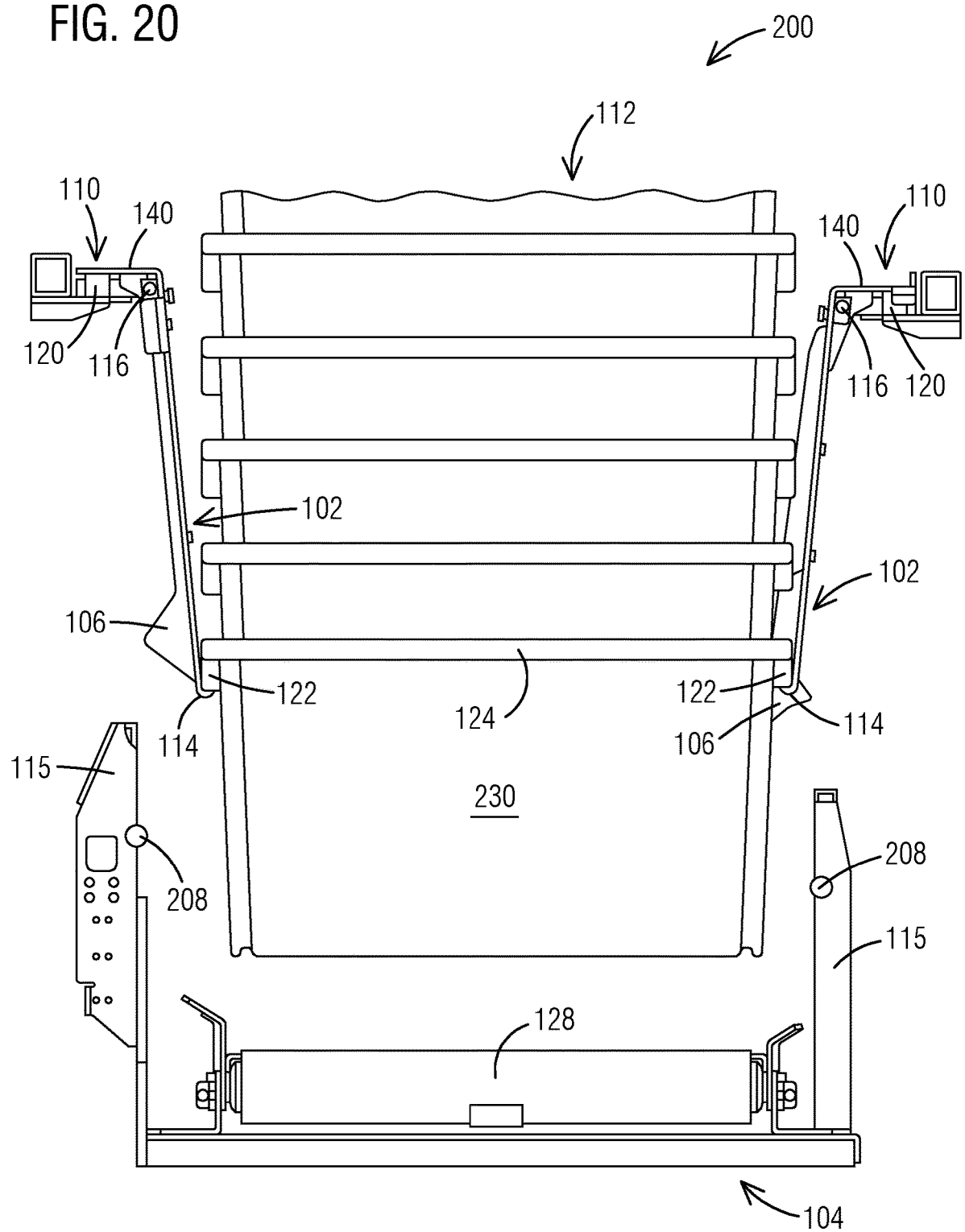

Finally, as shown in FIG. 20, the lifting member 104 reaches a point where the base 128 of the lifting member 104 has no contact with the tote stack 112. At this point, the lifting member 104 is ready to receive the next fresh tote and the above described stacking cycle may be repeated.

Figure 22:
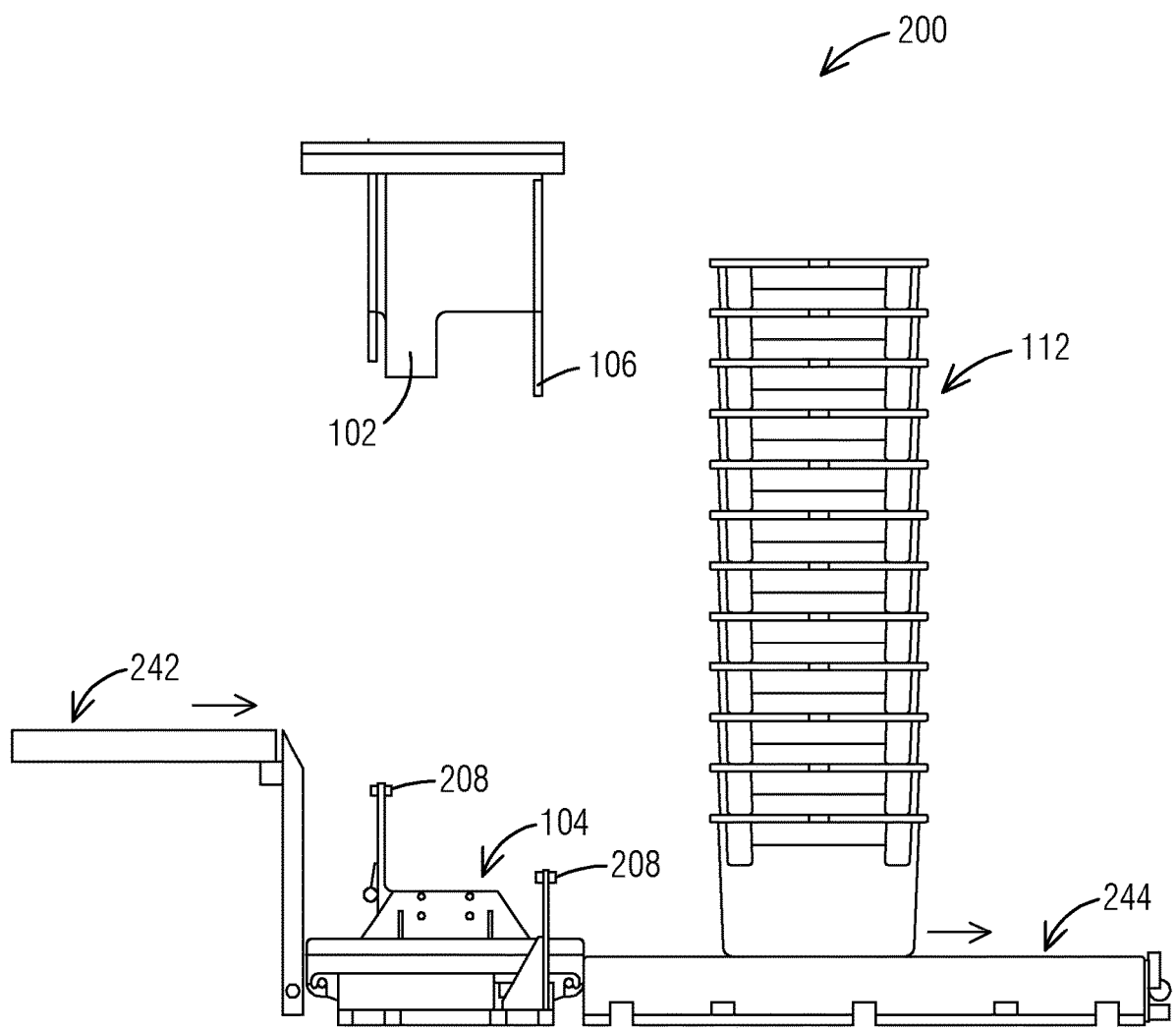
FIG. 22 illustrates a stack of totes being discharged via an outgoing conveyor after a stacking operation.

FIGS. 21 and 22 illustrate an exemplary configuration of portion of a material handling system including the described stacking apparatus 200. It is to be noted that the view shown in FIG. 21-22 is orthogonal to the view shown in FIG. 15-20.

As shown in FIG. 21, the lifting member 104 may be movable to interface with an incoming conveyor 242 to receive fresh totes 230 to commence each stacking cycle. Before the commencement of the above-described stacking cycles, the lifting member 104 receives an initial fresh tote 230 (first tote of the stacking operation) and raise the initial fresh tote 230 past the latches 102 with the latches 102 in the disengaged position. Upon further raising of the lifting member 104, each cam 106 interacts with the respective follower 208 to act on the latches 102 engage with the initial fresh tote 230. The holding mechanism 110 acts on the latches 110 to maintain engagement with the initial fresh tote 230 upon lowering of the lifting member 104 when the cams 106 cease to interact with the respective followers 208. Upon further lowering of the lifting member 104, each latch 102 interlocks with a mating feature 122 on the initial fresh tote 230, whereby the initial fresh tote 230 is retained by the latches 102. Subsequently, the stacking cycle described in FIG. 15-20 is executed repeatedly, whereby a tote stack 112 having a desired number of totes is formed which may be subsequently discharged to an outgoing conveyor 244 (FIG. 22).

Near the completion of a stacking operation, the lifting member 104 receives a final fresh tote 230 (last tote of the stacking operation) and moves the final fresh tote 230 upward into engagement with the tote stack 112, whereby the tote stack 112 is raised to disengage the latches 102 from the lowermost tote in the tote stack 112. During subsequent lowering of the lifting member 104, the holding mechanism 110 is remains inactive or is deactivated, whereby the latches 102 remain disengaged and the entire tote stack 112 including the final fresh tote 230 is released to move downward with the lifting member 104.

As shown in FIG. 22, the lifting member 104 is movable to interface with an outgoing conveyor 244 to discharge the tote stack 112 after completion of a stacking operation. In one embodiment, as shown, the incoming conveyor 242 and the outgoing conveyor 244 are positioned at different vertical heights and on opposite sides of the lifting member 104. In other embodiments, the incoming conveyor 242 and outgoing conveyor 244 may be positioned at different vertical heights but on the same side of the lifting member 104. In still other embodiments, the incoming conveyor 242 and the outgoing conveyor 244 may be positioned at the same height, on opposite sides of the lifting member 104.

In the described embodiments, performance is optimized by providing improved synchronization between the lifting member and the stack retaining latches. A higher efficiency has been realized in a more reliable performance than existing products, particularly by elimination of the need for compressed air to operate the system. Furthermore, cost of the solution may be reduced because of the simplicity of the system.

Although exemplary embodiments of the present disclosure have been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. An apparatus for separating totes from a stack of totes, comprising:
    first and second latches configured to be arranged on first and second sides of the stack of totes and engaged with a lowermost tote in the stack of totes to retain the stack of totes,
    a lifting member configured to engage with a bottom of the lowermost tote and raise the stack of totes to disengage the first and second latches from the lowermost tote,
    a cam and a respective follower arranged on each of the first and second sides and configured such that, upon lowering of the lifting member by a first distance after the disengagement of the latches, each cam interacts with the respective follower to act on the first and second latches to engage with a next tote above the lowermost tote,
    a holding mechanism configured to act on the first and second latches to maintain engagement with the next tote when the cams cease to interact with the respective followers upon lowering of the lifting member beyond the first distance,
    wherein, upon still further lowering of the lifting member, each latch interlocks with a mating feature on the next tote and the lowermost tote is separated from the stack of totes.

2. The apparatus of claim 1, wherein each cam is attached to a respective latch of the first and second latches, such that each cam and the respective latch pivot about a common axis, each cam being configured to be imparted motion upon interact with the respective follower.

3. The apparatus of claim 2, wherein each follower is mounted to the lifting member and moved vertically therewith.

4. The apparatus of claim 1, wherein each of the first and second latches is configured to return to a disengaged position in relation to the stack of totes when not acted on.

5. The apparatus of claim 1, wherein the holding mechanism comprises an electromagnetic component configured to act on each of the first and second latches.

6. The apparatus of claim 1, further comprising a controller for controlling an activation timing of the holding mechanism as a function of a position of the lifting member in an unstacking cycle, to control a dwell period of the first and second latches.

7. The apparatus of claim 6, wherein the controller is configured to activate the holding mechanism at or before a point in time when the cams lose contact with the respective followers in an unstacking cycle.

8. The apparatus of claim 6, wherein the controller is configured to deactivate holding mechanism at or before a point in time when each of the first and second latches interlocks with the mating feature on the next tote in an unstacking cycle.

9. The apparatus of claim 1, further comprising a separating mechanism configured to engage the lowermost tote during lowering of the lifting member to separate the lowermost tote from the stack of totes.

10. The apparatus of claim 9, wherein the separating mechanism comprises a movable pawl configured to freely pass over the lowermost tote during upward movement of stack of totes.

11. The apparatus of claim 1, wherein the lifting member is movable to a lowermost position in which the entire lowermost tote is positioned lower than a lowest point in the remainder of the stack of totes.

12. The method according to claim 1, wherein the lifting member is configured to interface with an incoming conveyor to receive the stack of totes and interface with an outgoing conveyor to discharge the separated tote.

13. A method for separating totes from a stack of totes, comprising:
    retaining a stack of totes at a desired height by engaging a lowermost tote in the stack of totes with first and second latches arranged on first and second sides of the stack of totes,
    raising the stack of totes by engaging a lifting member with a bottom of the lowermost tote to disengage the first and second latches from the lowermost tote,
    lowering the lifting member by a first distance to engage a cam with a respective follower arranged on each of the first and second sides, whereby each cam interacts with the respective follower to act on the first and second latches to engage with a next tote above the lowermost tote,
    lowering the lifting member beyond the first distance to disengage each cam from the respective follower, and maintaining engagement of the first and second latches with the next tote via a holding mechanism, and
    continuing lowering the lifting member, whereby each of the first and second latches interlocks with a mating feature on the next tote, and
    separating the lowermost tote from the stack of totes.

14. An apparatus for accumulating totes in a stack, comprising:
    first and second latches configured to be arranged on first and second sides of the stack of totes and engaged with a lowermost tote in the stack of totes to retain the stack of totes,
    a lifting member configured to receive a fresh tote and move the fresh tote upward into engagement with the stack of totes, whereby the stack of totes is raised to disengage the first and second latches from the lowermost tote,
    a cam and a respective follower arranged on each of the first and second sides and configured such that, upon further raising of the lifting member after the disengagement of the first and second latches, each cam interacts with the respective follower to act on the first and second latches to engage with the fresh tote,
    a holding mechanism configured to act on the first and second latches to maintain engagement with the fresh tote upon lowering of the lifting member when the cams cease to interact with the respective followers, wherein, upon further lowering of the lifting member, each latch interlocks with a mating feature on the fresh tote, whereby the fresh tote is attached to the stack of totes.

15. The apparatus of claim 14, further comprising a controller for controlling an activation timing of the holding mechanism as a function of a position of the lifting member in a stacking cycle, to control a dwell period of the first and second latches.

16. The apparatus of claim 15, wherein the controller is configured to activate the holding mechanism at or before a point in time when the cams lose contact with the respective followers in a stacking cycle.

17. The apparatus of claim 15, wherein the controller is configured to deactivate holding mechanism at or before a point in time when each of the first and second latches interlocks with the mating feature on the fresh tote in a stacking cycle.

18. The apparatus of claim 14,
wherein the lifting member is configured to receive an initial fresh tote of a stacking operation and raise the initial fresh tote past the first and second latches with the first and second latches in a disengaged position,
wherein, upon further raising of the lifting member, each cam is configured to interact with the respective follower to act on the first and latches to engage with the initial fresh tote,
wherein the holding mechanism is configured to act on the first and second latches to maintain engagement with the initial fresh tote upon lowering of the lifting member when the cams cease to interact with the respective followers, and
wherein, upon further lowering of the lifting member, each latch interlocks with a mating feature on the initial fresh tote, whereby the initial fresh tote is retained by the first and second latches.

19. The apparatus of claim 14,
wherein the lifting member configured to receive a final fresh tote of a stacking operation and move the final fresh tote upward into engagement with the stack of totes, whereby the stack of totes is raised to disengage the first and second latches from the lowermost tote in the stack of totes, and
wherein, during subsequent lowering of the lifting member, the holding mechanism is configured to be deactivated, whereby the first and second latches remain disengaged and the entire stack of totes including the final fresh tote is released to move downward with the lifting member.

20. The apparatus of claim 14, wherein the lifting member is configured to interface with an incoming conveyor to receive fresh totes and interface with an outgoing conveyor to discharge the stack of totes upon completion of a stacking operation.

* * * * *